(12) United States Patent
Cheng et al.

(10) Patent No.: US 10,360,689 B2
(45) Date of Patent: *Jul. 23, 2019

(54) DETECTING SPECIFIED IMAGE IDENTIFIERS ON OBJECTS

(71) Applicant: Alibaba Group Holding Limited, George Town (KY)

(72) Inventors: Gang Cheng, Beijing (CN); Rufeng Chu, Beijing (CN); Lun Zhang, Beijing (CN)

(73) Assignee: Alibaba Group Holding Limited (KY)

( * ) Notice: Subject to any disclaimer, the term of this patent is extended or adjusted under 35 U.S.C. 154(b) by 0 days.

This patent is subject to a terminal disclaimer.

(21) Appl. No.: 15/705,016

(22) Filed: Sep. 14, 2017

(65) Prior Publication Data

US 2018/0005390 A1   Jan. 4, 2018

Related U.S. Application Data

(63) Continuation of application No. 14/811,345, filed on Jul. 28, 2015, now Pat. No. 9,799,119.

(30) Foreign Application Priority Data

Jul. 29, 2014 (CN) .......................... 2014 1 0367807

(51) Int. Cl.
*G06K 9/62* (2006.01)
*G06K 5/00* (2006.01)
(Continued)

(52) U.S. Cl.
CPC .............. *G06T 7/33* (2017.01); *G06K 9/3233* (2013.01); *G06K 9/38* (2013.01); *G06T 7/13* (2017.01); *G06K 2009/363* (2013.01)

(58) Field of Classification Search
CPC .......... G06T 7/0081; G06T 5/001; G06T 7/60; G06T 7/0085; G06T 2207/20112;
(Continued)

(56) References Cited

U.S. PATENT DOCUMENTS 5,436,970 A   7/1995 Ray
5,740,244 A   4/1998 Indeck
(Continued)

FOREIGN PATENT DOCUMENTS

CN   101751572   6/2010
CN   102426647   4/2012
(Continued)

OTHER PUBLICATIONS

Felzenszwalb et al. "Object detection with discriminatively trained part-based models." Pattern Analysis and Machine Intelligence, IEEE Transactions on 32.9 (2010): 1627-1645.
(Continued)

*Primary Examiner* — Sheela C Chawan
(74) *Attorney, Agent, or Firm* — Van Pelt, Yi & James LLP

(57) ABSTRACT

Embodiments of the present application relate to a method, apparatus, and system for detecting a specified image identifier. The method includes retrieving a target image to be detected from a predetermined area, binarizing the target image to be detected to obtain a target binary image to be detected, calibrating connected domains of the target binary image to be detected, successively retrieving image features of candidate connected domains, and comparing the image features corresponding to the candidate connected domains to image features of a standard specified identifier image, wherein the candidate connected domains are determined based at least in part on the calibration of the connected domains, and determining a candidate connected domain as
(Continued)

the location of the specified identifier image based at least in part on the comparison of the image features corresponding to the candidate connected domains to image features of the standard specified identifier image.

20 Claims, 11 Drawing Sheets

(51) Int. Cl.
*G06T 7/33* (2017.01)
*G06K 9/32* (2006.01)
*G06K 9/38* (2006.01)
*G06T 7/13* (2017.01)
*G06K 9/36* (2006.01)

(58) Field of Classification Search
CPC .. G06T 7/0083; G06K 9/4609; G06K 9/6203; G06K 9/20; G06K 9/38; G06K 2009/363; G06K 9/3233; G07D 7/00
USPC ........ 382/195, 209, 309; 235/379, 380, 487, 235/375
See application file for complete search history.

(56) References Cited

U.S. PATENT DOCUMENTS

| | | | |
|---|---|---|---|
| 6,785,815 B1 | 8/2004 | Serret-Avila | |
| 7,246,239 B2 | 7/2007 | Rodriguez | |
| 7,424,131 B2 | 9/2008 | Alattar | |
| 7,770,013 B2 | 8/2010 | Rhoads | |
| 8,006,092 B2 | 8/2011 | Rodriguez | |
| 8,019,115 B2 | 9/2011 | Alasia | |
| 8,123,134 B2 | 2/2012 | Reed et al. | |
| 8,175,329 B2 | 5/2012 | Alattar | |
| 8,285,074 B2 | 10/2012 | Saund | |
| 8,805,125 B1 | 8/2014 | Kumar | |
| 8,910,861 B2 | 12/2014 | Wadia | |
| 9,047,728 B1 | 6/2015 | Irudayam | |
| 9,191,403 B2 | 11/2015 | Zoldi | |
| 9,311,640 B2 | 4/2016 | Filler | |
| 9,330,310 B2 | 5/2016 | Jiang | |
| 9,436,816 B2 | 9/2016 | Nice | |
| 9,799,119 B2 * | 10/2017 | Cheng | G06K 9/3233 |
| 2002/0012445 A1 | 1/2002 | Perry | |
| 2002/0012447 A1 | 1/2002 | Amidror | |
| 2002/0099943 A1 | 7/2002 | Rodriguez | |
| 2002/0122568 A1 | 9/2002 | Zhao | |
| 2002/0126871 A1 | 9/2002 | Hannigan | |
| 2005/0156048 A1 | 7/2005 | Reed | |
| 2007/0170257 A1 | 7/2007 | Haraszti | |
| 2007/0180262 A1 | 8/2007 | Benson | |
| 2010/0163629 A1 | 7/2010 | Rhoads | |
| 2012/0051649 A1 | 3/2012 | Saund | |
| 2013/0328916 A1 | 12/2013 | Arikan | |
| 2014/0037184 A1 | 2/2014 | Gorski | |
| 2015/0117701 A1 | 4/2015 | Ross | |

FOREIGN PATENT DOCUMENTS

| | | |
|---|---|---|
| CN | 102799653 | 11/2012 |
| CN | 102819728 | 12/2012 |
| CN | 102855472 | 1/2013 |
| CN | 102194118 | 4/2013 |
| CN | 103679147 | 3/2014 |
| EP | 2713313 | 4/2014 |
| JP | 2005005768 | 1/2005 |
| WO | WO2014028747 | 2/2014 |
| WO | WO2014046918 | 3/2014 |

OTHER PUBLICATIONS

Haralick et al. Computer and Robot Vision, vol. I, Addison-Wesley, 1992, pp. 28-48.
Nobuyuki Otsu. "A threshold selection method from gray-level histograms." Automatica 11.285-296 (1975): 23-27.
Yi Er Shi Eryue Sannian, "CUP Card Operations Regulations: vol. III Card BIN number and identification rules" China UnionPay, Dec. 2013. Machine Translated.

* cited by examiner

DETECTING SPECIFIED IMAGE IDENTIFIERS ON OBJECTS

CROSS REFERENCE TO OTHER APPLICATIONS

This application is a continuation of co-pending U.S. patent application Ser. No. 14/811,345, entitled DETECTING SPECIFIED IMAGE IDENTIFIERS ON OBJECTS filed Jul. 28, 2015 which is incorporated herein by reference for all purposes, which claims priority to People's Republic of China Patent Application No. 201410367807.9 entitled A METHOD AND DEVICE USED TO DETECT SPECIFIED IDENTIFIER IMAGES IN A PREDETERMINED AREA, filed Jul. 29, 2014 which is incorporated herein by reference for all purposes.

FIELD OF THE INVENTION

The present application relates to the field of fraud detection. In particular, the present application relates to a method, device, and system for fraud detection in standard cards.

BACKGROUND OF THE INVENTION

Specified identifiers such as logos are generally recognized according to various physical detection mechanisms. Specified identifiers are generally used to indicate a certain feature of an object such as a credit card. Identifiers can be used as a reference for recognizing objects (e.g., identifying an account associated with the object or owner of the object, or identifying a type of object). Objects that include specified identifiers generally have specified identifiers that have distinct appearances or notable spatial locations, so that the objects or specified identifiers are more easily identified. The specified identifiers can be implemented as an identifier object on the object such as the card. For bank cards, identifier objects generally include the graphic identifiers and text identifiers of the card issuer.

The recognition of identifier objects can serve as an important basis for distinguishing the authenticity of the bank card. For example, the identifier objects can be verified to determine whether the object comprising the specified identifiers is genuine or valid.

Identifier objects are generally associated with defined size specifications and relative location identifiers. For example, authentic bank cards are generally printed using standard identifier objects. However, because the workmanship of counterfeit bank cards is poor and because counterfeiting bank cards (or other objects carrying specified identifiers that can be implemented in the form of identifier objects) is performed at a lower cost, printing controls associated with the printing of authentic bank cards are generally not stringent. Accordingly, recognition of the identifier objects can be used to obtain the dimensions and relative positioning of the identifier objects. Comparison of the obtained dimensions and relative positioning of the identifier objects to a standard bank card can provide an effective reference for distinguishing authenticity of a bank card.

The recognition of identifier objects can provide reference identifiers for bank card detection and correction.

Bank cards generally have associated defined uniform style rules for identifier objects. For example, bank cards can have defined edge identifiers. The defined edge identifiers can provide a clear indication that the card or other object is a bank card. An image of the card to be analyzed can be captured. An edge can be obtained based on recognition of the defined edge identifier. The obtained edge can be used to obtain the currently captured image via an affine transformation based on the obtained edge, thus enabling correction of the image to benefit subsequent precision detection and positioning of the bank card. A conventional bank card according to some related art may not be associated with unified standard. However, a conventional bank card can comprise markers that generally have clear dimensions and relative position. Accordingly, edge information of such bank cards is typically relatively clear. An identifier can be obtained via an affine transformation using an affine transformation matrix. According to some related art, the identifier would have the specifications of the marker. Because bank cards and markers according to some related art are coplanar, the same affine transformation matrix can be used to obtain bank card numbers affine transformation matrix, to obtain a corrected image, and to help with detection and localization.

The recognition of identifier objects can enable service providers to engage in accurate advertising push services based on specified identifier objects.

Identifier objects often indicate specified identifiers of a bank card, for example, the card issuer and the scope of use. Accordingly, the recognition of identifier objects enables businesses to engage in accurate advertising push services targeting the bank card, and increases service quality. In addition, in the event that an identifier of the identifier object is retrieved, and is combined with augmented reality technology, multimedia advertising displays can be implemented.

In a given image or video segment, object detection can include finding the location of a specified identifier or an object of interest in the image or video. For example, according to specific use scenarios, the final output of object detection systems is generally an enclosing rectangular frame or the precise contour of the object.

According to some related art, two categories of object detection are generally used. The two categories of object detection include object detection using a sliding window and object detection using a generalized Hough transform. The sliding window object detection method includes the use of a trained model to perform a sliding scan of multiple dimensions and multiple visual angles of an input image, to find the enclosing window of a target object by determining the maximum corresponding positions.

According to the sliding window method implemented by related art for object detection, when data is being analyzed and scanned, the computation volume is significant, and calculation complexity is also relatively high, which result in longer detection times that are better suited for more complex object structures. Further, the sliding window method is generally not suitable for recognizing an identifier that has a relatively fixed structure.

BRIEF DESCRIPTION OF THE DRAWINGS

Various embodiments of the invention are disclosed in the following detailed description and the accompanying drawings.

DETAILED DESCRIPTION

Figure 1:
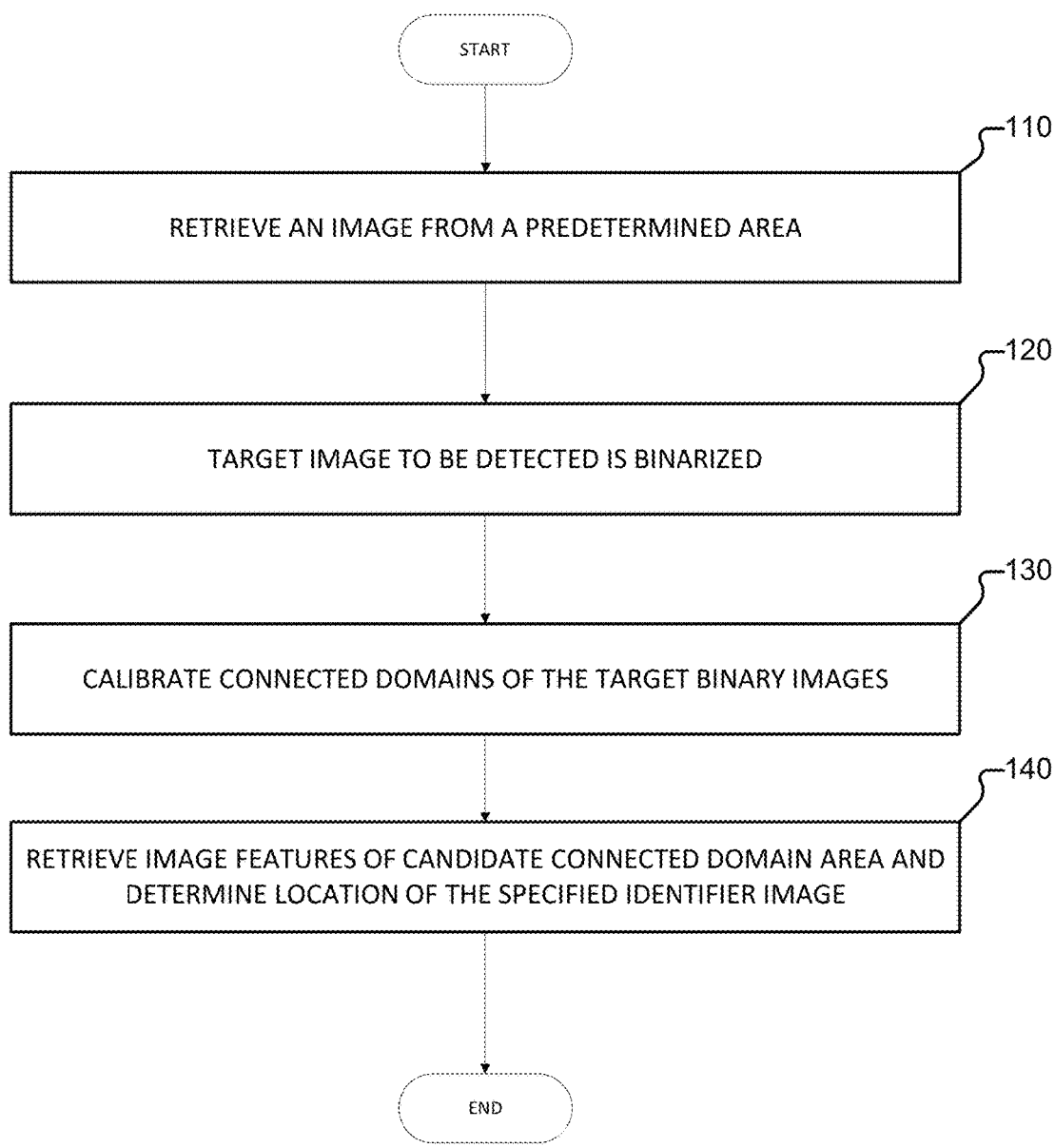
FIG. 1 is a flow chart of a method to detect specified identifier images in a predetermined area according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The description below expounds many concrete details in order that the present application may be fully understood. However, the present application can be implemented in many ways other than those described here. A person skilled in the art may extend it similarly without violating the meaning of the present application. Therefore, the present application is not limited by the specific embodiments disclosed below.

Various embodiments of the present disclosure include a method, device, and system for detecting an identifier (e.g., a specific identifier) included on an object. The object including the identifier can be a bank card, a document, an identification card such as a license or a passport, the like, or any combination thereof. For example, the identifier can be included on an object in connection with an authentication mechanism (e.g., the identifiers can be detected in connection with authenticating the object including the identifier).

The present application uses the area in which the card face of a bank card is located as the predetermined area to describe the specific process of implementing the present application. However, it should be noted that the method according to various embodiments of the present application is not limited to recognition of banking syndicate logos on bank cards. According to various embodiments, the method of the present application can be used in implementations for recognizing or identifying at least a portion of an object in which specified or known identifiers are included in a predetermined area.

In some embodiments, specific identifiers (e.g., known identifiers that can be used in connection with authenticating an object) can include product identifiers, corporate logos, the like, or any combination thereof.

In some embodiments, the predetermined area of a product identifier can be the surface area of the product itself. In some embodiments, the predetermined area of a corporate logo can be any carrier (e.g., object) that includes the logo.

FIG. 1 is a flow chart of a method to detect specified identifier images in a predetermined area according to various embodiments of the present application.

Referring to FIG. 1, process 100 to detect or identify specified identifiers such as specified identifier images is provided. Process 100 can be implemented by device 1000 of FIG. 10 or computer system 1100 of FIG. 11.

At 110, an image is retrieved from a predetermined area. For example, an image included on an object such as a bank card, a document, or the like can be retrieved. The image of the object can be captured using a camera, a scanner, or the like. The image from the predetermined area can be extracted from an image or other electronic representation (e.g., a file) corresponding to the object. For example, an image or other electronic representation corresponding to the object can be processed to retrieve (e.g., extract) the image from the predetermined area of the image or other electronic representation corresponding to the object. The image from the predetermined area can serve as the target image to be detected.

At 120, the target image to be detected is binarized. Binarization of the target image to be detected includes determining a binary representation of the target image to be detected (e.g., the image from the predetermined area). For example, the target image to be detected can be converted to a binary representation thereof. Binarization of the target image includes obtaining a binary image (that is, an image comprising black or white pixels) and a negative image of the binary image. The binary image associated with the target image to be detected and the negative image of the binary image can be collectively referred to as the target binary images to be detected.

At 130, connected domains of the target binary images to be detected are calibrated. 130 can further include determining a candidate connected domain area based at least in part on the calibration of the connected domains of the target binary images to be detected. For example, an area in which the connected domain of the calibrated connected domains has a number of pixels that satisfies a set threshold can be used as, or otherwise determined to be or set as, a candidate connected domain area. One or more candidate connected domain areas can be successively determined according to each calibrated connected domain that satisfies the condition associated with the number of pixels. For example, the calibrated connected domains can be successively analyzed to determine whether the corresponding calibrated connected domain is a candidate connected domain area.

At 140, image features of a candidate connected domain area are retrieved and a location of the specified identifier image is determined. In some embodiments, in the event that a plurality of candidate connected domain areas is determined, the candidate connected domain areas are successively retrieved and compared to a standard specified identifier image. The comparing of a candidate connected domain area can include a comparison of the image features of the candidate connected domain area against corresponding image features of the standard specified identifier image. The candidate connected domain area having the same or the closest comparison results can be determined to be the location of the specified identifier image. For example, the candidate connected domain area that is most similar to the standard specified identifier image is determined to correspond to the location to the specified identifier image. In some embodiments, the standard specified identifier image includes a representation of an identifier that is used as a basis for determining authenticity of an object including a copy of the specified identifier image.

Through 110-140, when data is being scanned and analyzed, the scanning and analysis of the data is carried out in a relatively small area. Therefore, process 100 is able to reduce the volume of computations and decrease computation complexity, enabling rapid completion of detection based on image features.

Referring to 100, the predetermined area can correspond to the card face area of a bank card. According to such an implementation, retrieval of the image from a predetermined area can include retrieval of a bank card face image or an image containing the bank card face area. The retrieval of the image can be performed by using a mobile terminal (e.g., capturing the image using a camera, a scanner, or other image detector) or by downloading an image file from a specific location. In some embodiments, the retrieval of a predetermined area or image containing this retrieval area can be performed using the image-capturing function of a mobile terminal such a mobile phone, a tablet, a laptop, or the like. For example, an application installed on the mobile terminal can be executed that can cause a camera (e.g., integrated with the mobile terminal) to capture an image of the predetermined area. The predetermined area can be selected to reduce the detection scanning range, thereby increasing detection speed while also lowering the volume of computations.

According to some embodiments, in order to further increase detection efficiency and decrease detection of non-banking syndicate identifier areas, during retrieval of the bank card image or image containing the bank card area, preview images of the retrieved bank card image or image containing the bank card face can be retrieved. Based on the dimensions of the standard bank card and the resolution rate of the preview images, the length and width of a virtual frame of the framed preview images can be obtained (e.g., determined). The top, bottom, left, and right borders of the virtual frame can be computed (e.g., determined) based on the length of the virtual frame. The dimensions of the standard bank card can be preset (e.g., according to defined specifications associated with a standard bank card), can be manually entered (e.g., via input to the terminal), or can be determined using the preview image.

Figure 2:
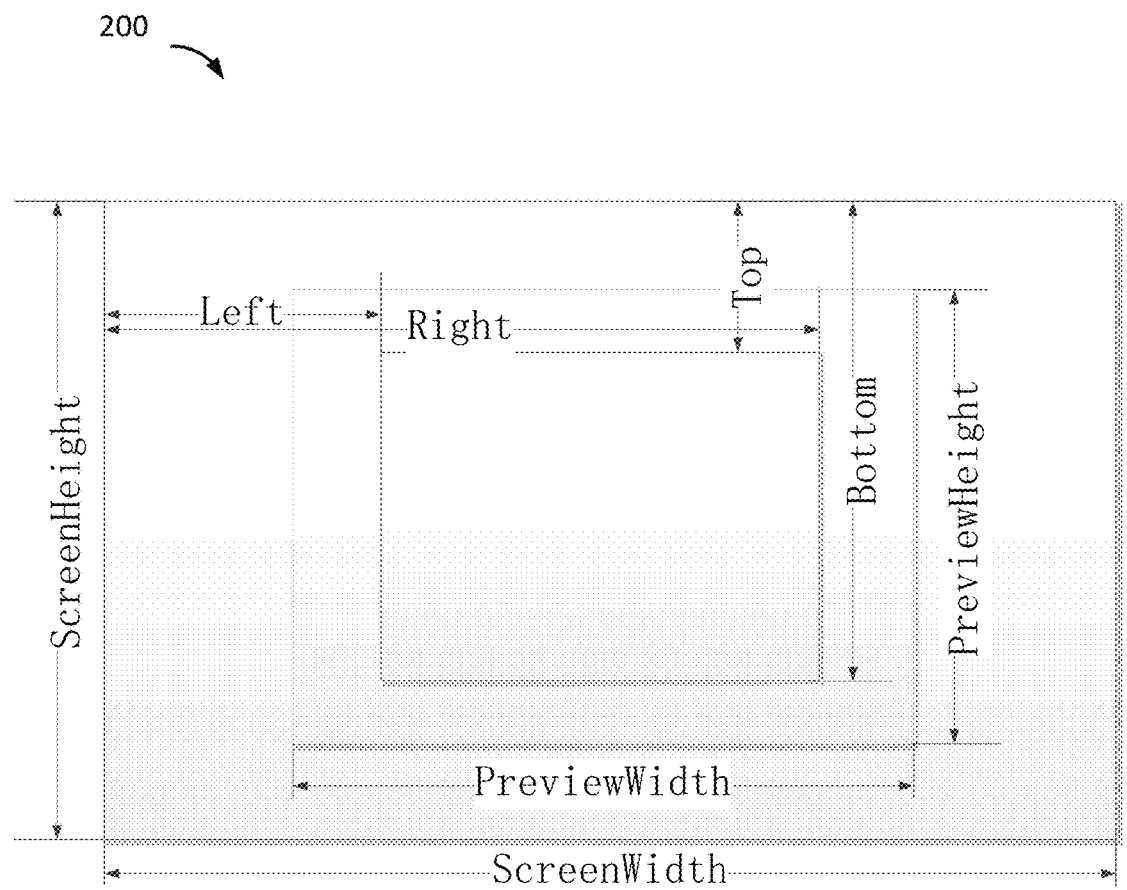
FIG. 2 is a schematic diagram of a virtual frame computation in a method to detect specified identifier images in a predetermined area according to various embodiments of the present application.

FIG. 2 is a schematic diagram of a virtual frame computation in a method to detect specified identifier images in a predetermined area according to various embodiments of the present application.

Referring to FIG. 2, a preview image 200 from which a virtual frame 210 is to be computed is provided. In some embodiments, virtual frame 210 computed using the preview image 200 can be used in connection with detecting specified identifier images. Preview image 200 can be captured in connection with process 100 of FIG. 1. Preview image 200 can be captured, or otherwise computed, by device 1000 of FIG. 10 or computer system 1100 of FIG. 11.

Standard bank card dimension parameters can be used in connection with detecting specified identifier images in a predetermined area. In some embodiments, the standard bank card dimension parameters are specified according to industry standards or regulations. As an example, the standard bank card dimension parameters can be determined based at least in part on volume 3, "Card Bin Number and Identifier Rules," of the "Bank Card Service Operation Rules." For example, the card width can be 85.60 mm±0.30 mm, and the card height can be 53.98 mm±0.30 mm. In some implementations, the error range (tolerances) of 0.30 mm can be ignored (e.g., not considered in connection with the detection of specified identifier images). For example, the card width can be set as CardWidthGdt=85.60 mm, and the card height can be set as CardHeightGdt=53.98 mm. Assuming that the resolution of the mobile terminal screen corresponds to length×height (e.g., ScreenWidth×ScreenHeight of FIG. 2), the resolution parameter of the preview image corresponds to width×height (i.e., PreviewWidth×PreviewHeight of FIG. 2), and the ratio parameter of the virtual frame area to the preview image area is DisplayRatio, then when computing the virtual frame, first, a determination is made as to whether PreviewHeight (e.g., the height of the preview image)×CardWidthGdt (e.g., the width of the card) is greater than PreviewWidth (e.g., the width of the preview image)×CardHeightGdt (e.g., the height of the card).

If PreviewHeight×CardWidthGdt is greater than PreviewWidth×CardheightGdt, then the virtual frame is scaled such that:

ScaledWidth=CardWidth*Gdt*×PreviewHeight/CardHeight*Gdt*×DisplayRatio, and

ScaledHeight=PreviewHeight×DisplayRatio.

If PreviewHeight×CardWidthGdt is not greater than PreviewWidth×CardheightGdt, then the virtual frame is scaled such that:

ScaledHeight=CardHeight*Gdt*×PreviewWidth/CardWidth*Gdt*×DisplayRatio, and

ScaledWidth=PreviewWidth×DisplayRatio.

After obtaining (e.g., computing) the width and height of the virtual frame, the top, bottom, left, and right borders of the virtual frame can be determined based on the resolution parameter of the mobile terminal screen.

The top border of the virtual frame can be determined according to:

Top=ScreenHeight/2−ScaledHeight/2.

The bottom border of the virtual frame can be determined according to:

Bottom=ScreenHeight/2+ScaledHeight/2.

The left border of the virtual frame can be determined according to:

Left=ScreenWidth/2−ScaledWidth/2.

The right border of the virtual frame can be determined according to:

Right=ScreenWidth/2+ScaledWidth/2.

Figure 3:
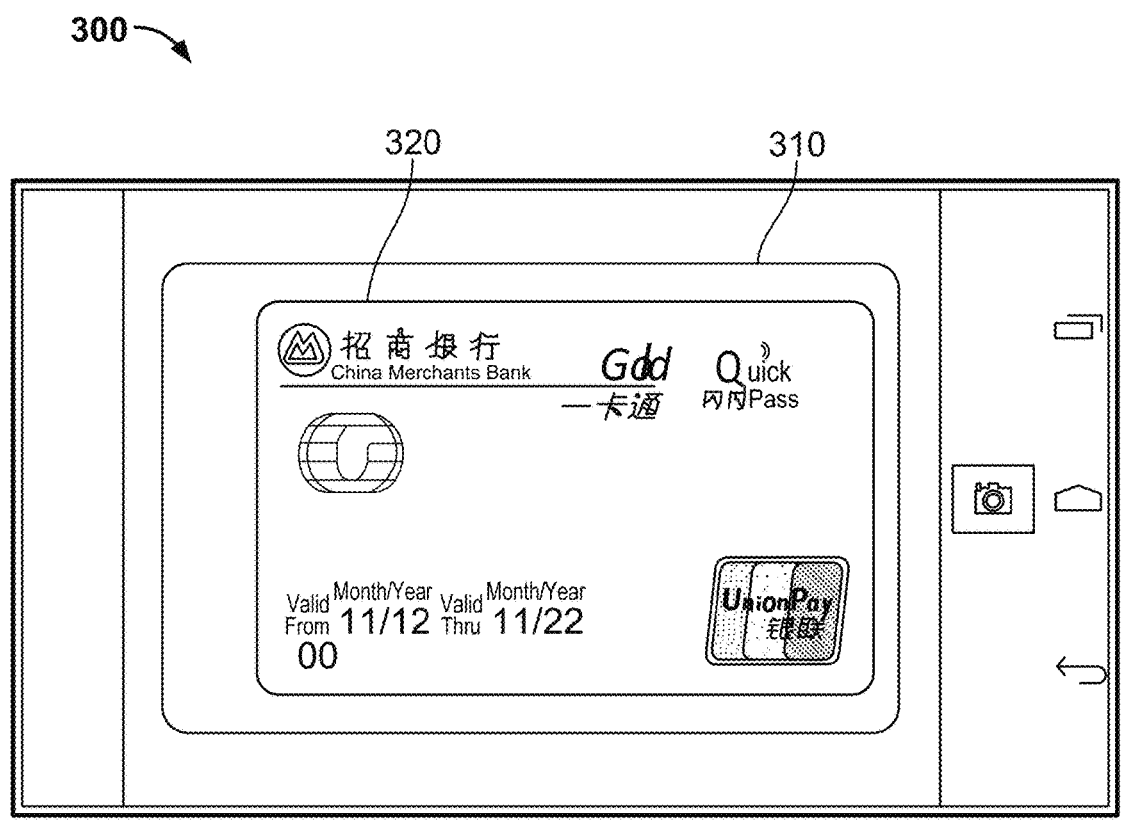
FIG. 3 is a schematic diagram of a virtual edge in a method to detect specified identifier images in a predetermined area according to various embodiments of the present application.

FIG. 3 is a schematic diagram of a virtual edge in a method to detect specified identifier images in a predetermined area according to various embodiments of the present application.

Referring to FIG. 3, a screen 300 of a terminal displaying an image associated with a bank card is provided. Screen 300 displays a virtual frame 310. Virtual frame 310 can be displayed in connection with process 100 of FIG. 1. Virtual frame 310 can be displayed by device 1000 of FIG. 10 or computer system 1100 of FIG. 11.

In some embodiments, the virtual frame 310 covers the upper portion of the bank card 320 in the bank card image or area including the bank card image. The area within the range covered by the virtual frame 310 is used as the target image to be detected, thus achieving reduction in the detection range. The area range including the bank identifier image within the virtual frame coverage range can be intercepted (e.g., captured or processed.) For example, the area range including the bank identifier image can be intercepted based on specified location information for the banking syndicate identifier in standard bank cards. The area range including the bank identifier image (e.g., the intercepted area range) can be used as the target image to be detected. Accordingly, the detection range can be further reduced (e.g., minimized) in order to increase detection speed and reduce the volume of operations.

Figure 4:
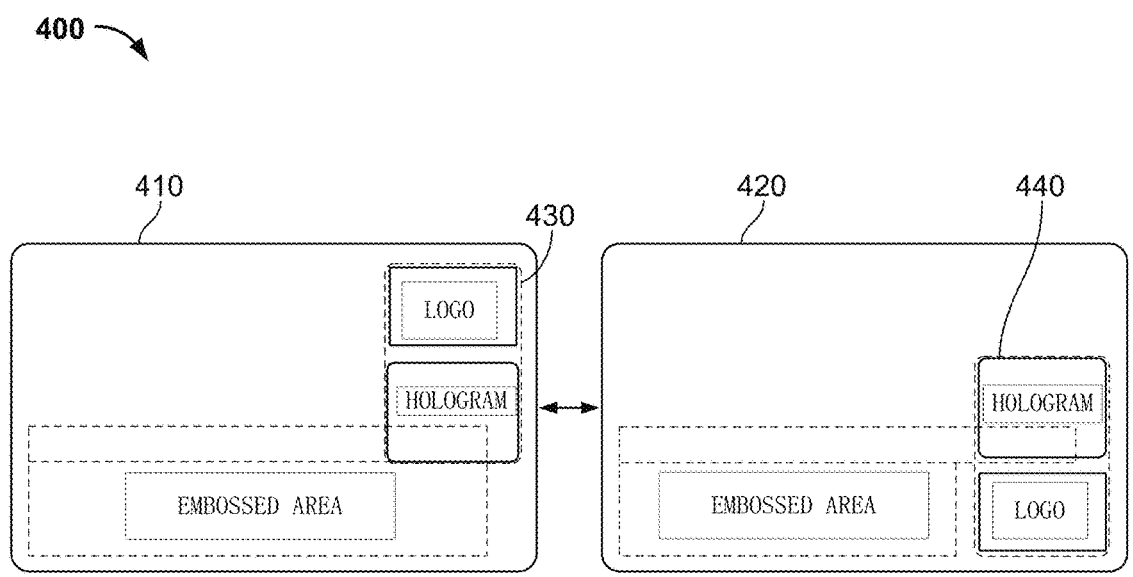
FIG. 4 is a schematic diagram of an interception of an area range including a specified identifier image in a method to detect specified identifier images in a predetermined area according to various embodiments of the present application.

FIG. 4 is a schematic diagram of an interception of an area range including a specified identifier image in a method to detect specified identifier images in a predetermined area according to various embodiments of the present application.

Referring to FIG. 4, a process 400 of intercepting an area range on a bank card 410 is provided. Process 400 can be performed in connection with process 100 of FIG. 1. Process 400 can be implemented by device 1000 of FIG. 10 or computer system 1100 of FIG. 11.

An area range including a specified identifier image can be intercepted in connection with a method used to detect specified identifier images in a predetermined area 410. The predetermined area can be a front surface of a bank card. The location of a specified identifier image can be known in advance (e.g., the location of the specified identifier image can be predefined). For example, based on volume 3, "Card Bin Number and Identifier Rules," of the "Bank Card Service Operation Rules," the location information of the banking syndicate identifier on the bank card can be the location set in advance. As illustrated in FIG. 4, the bank identifier area is located on the right side of the card in two formats: upper placement and lower placement. Predetermined area 410 can include the bank identifier area 430 in an upper placement format, and predetermined area 420 can include the bank identifier area 440 in a lower placement format.

As illustrated in connection with predetermined area 420 of FIG. 4, in the event that the banking syndicate identifier is included on the predetermined area 420 according to the lower placement format, the banking syndicate identifier 440 is located in the lower right corner of the bank card (e.g., of the predetermined area 420). In some embodiments, the specific requirements of the lower placement format include the banking syndicate identifier having a width of 22 mm and a height of 15 mm, a distance between the right edge of the banking syndicate identifier 440 and the right edge of the bank card is 2 mm, and a distance between the bottom edge of the banking syndicate identifier 440 and the bottom edge of the bank card is 2 mm.

As illustrated in connection with predetermined area 410 of FIG. 4, in the event that the banking syndicate identifier is included on the predetermined area 410 according to the upper placement format, the banking syndicate identifier 430 is located in the upper right corner of the bank card. In some embodiments, the specific requirements of the upper placement format include the banking syndicate identifier having a width of 22 mm and a height of 15 mm, a distance between the right edge of the banking syndicate identifier and the right edge of the bank card is 2 mm, and a distance between the top edge of the banking syndicate identifier and the top edge of the bank card is 2 mm.

Based on the positioning of the banking syndicate identifier described above, when the bank card image is intercepted, it is possible to only process the upper right corner and the lower right corner of the bank card image or image containing the bank card area. For example, the banking syndicate identifier can be located and processed by processing the various locations among which the banking syndicate identifier is known to exist. As an example, assuming the resolution (width×height) of the bank card image or image including the bank card area is: Width×Height, then the images that need to be intercepted (e.g., captured and processed) are [Width/2, Width]×[0, Height] and [Width/2, Width]×[Height/2, Height].

Figure 5:
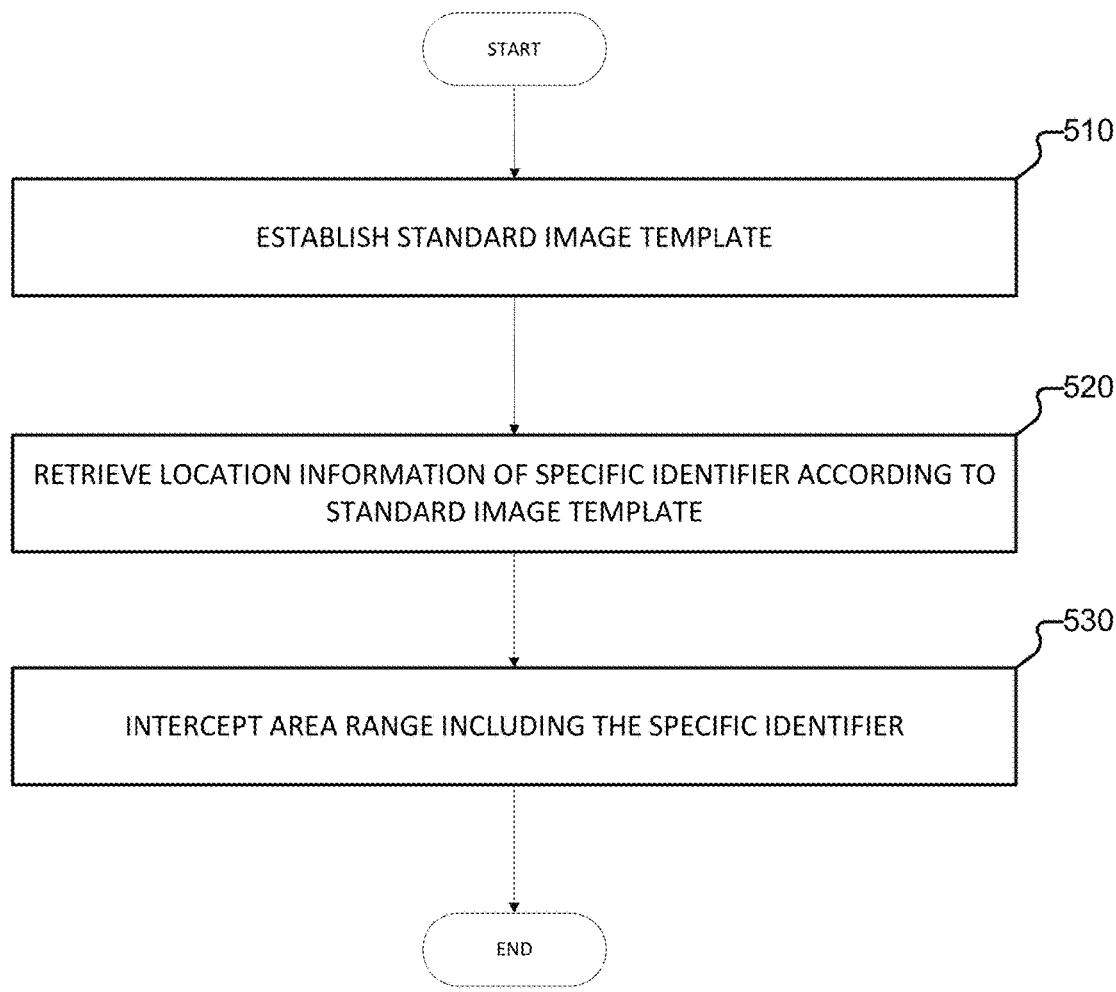
FIG. 5 is a flow chart of an interception of an area range including a specified identifier image in a method to detect specified identifier images in a predetermined area according to various embodiments of the present application.

FIG. 5 is a flow chart of an embodiment of a process for intercepting an area range including the specified identifier image. Process 500 can be implemented in connection with process 100 of FIG. 1. Process 500 can be implemented by device 1000 of FIG. 10 or computer system 1100 of FIG. 11.

At 510, a standard image template is established. For example, a standard image template corresponding to a predetermined area is determined. In some embodiments, the standard image template is stored as an image file. The standard image template can be defined according to regulations (e.g., China UnionPay (CUP) card regulations) promulgated by a standard unified organization (e.g., CUP). The standard image template corresponding to the predetermined area can be determined in connection with a detection of a specified identifier image in the predetermined area. In some embodiments, the predetermined area is a bank card image (e.g., a captured image of a face of a bank card such as the front of the bank card). Accordingly, a standard image template of the bank card image is established.

At 520, location information of a specific identifier is retrieved based at least in part on the standard image template. In some embodiments, the standard image template based on the bank card image or an image including the bank card area is traversed to retrieve the location information of the banking syndicate image (e.g., the specific identifier). The standard image template based on the bank card image or the image including the bank card area can be traversed according to correspondences between the standard image template and the bank card image or image including the bank card area. In response to traversal of the standard image template, the location information associated with the banking syndicate identifier image in the bank card image or the image including the bank card area is retrieved.

At 530, an area range including the specific identifier is intercepted. The area range can be intercepted according to the retrieved location information of the specific identifier. For example, based at least in part on the location information of the specific identifier, the area range including the banking syndicate identifier can be intercepted and the area range of this intercepted banking syndicate identifier image can be used as the target image to be detected. In some embodiments, the interception (e.g., processing) of the area range includes identifying the area range. The interception of the area range can also include processing the area range (e.g., image processing the area range in connection with detection of an identifier). The interception of the area range can include extracting the area range from a larger area of the predetermined area.

In some embodiments, based on this bank card image or image including the bank card area, the image area including the banking syndicate identifier can be directly intercepted (e.g., processed) based on the specified location information of the banking syndicate identifier or based on the standard image template of the bank card. For example, the image area including the banking syndicate identifier can be processed according to specified location information defined by the standard image template. The image area (e.g., the intercepted image area) can be used as the target image to be detected. In some embodiments, based on the virtual frame, only the portion of the virtual frame range that includes the banking syndicate identifier image is intercepted, and the image information outside the virtual frame is discarded, thereby increasing detection efficiency.

Referring back to 120 of FIG. 1, the target image to be detected is binarized. Binarization of the target image to be detected is performed to obtain a binary image and a negative image of the binary image. The binary image associated with the target image to be detected and the negative image of the binary image can be collectively referred to as the target binary images to be detected.

Figure 6:
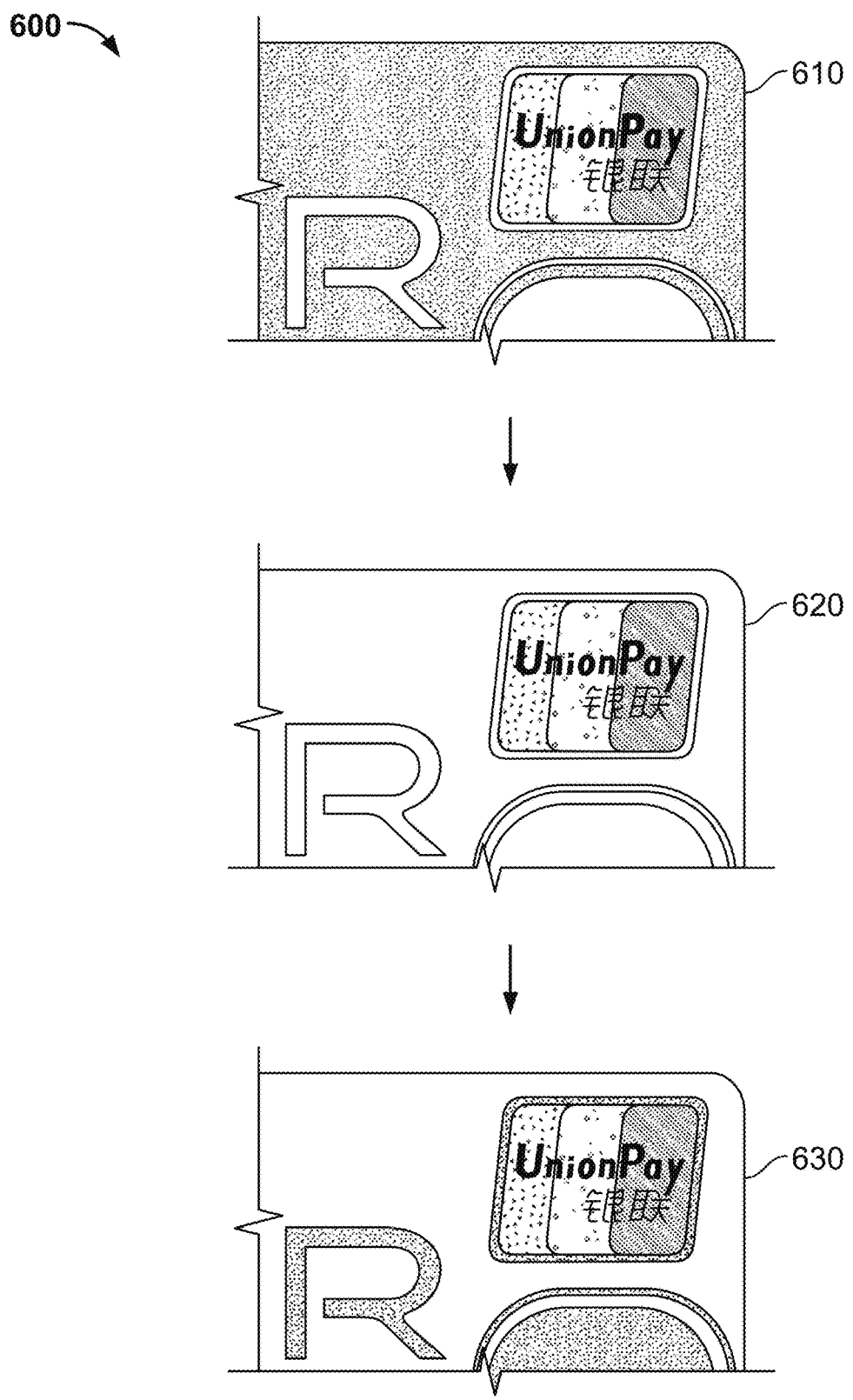
FIG. 6 is a schematic diagram of a binary image after binarization in a method to detect specified identifier images in a predetermined area according to various embodiments of the present application.

FIG. 6 is a schematic diagram of a binary image after binarization in a method to detect specified identifier images in a predetermined area according to various embodiments of the present application.

Referring to FIG. 6, process 600 to binarize a target image is provided. Process 600 can be implemented in connection with process 100 of FIG. 1. For example, process 600 can be implemented in connection with 120 of FIG. 1. Process 600 can be implemented by device 1000 of FIG. 10 or computer system 1100 of FIG. 11.

The target image to be detected (e.g., the intercepted image of the area range of the image including the banking syndicate identifier) is binarized. Image binarization refers to setting the grayscale values of the pixel points on the image to 0 or 255. In other words, the target image as a whole is caused to exhibit the visual effect of including only black and white. In some embodiments, the target image is caused to exhibit the visual effect of including only black and white by taking a grayscale image 610 that has 256 brightness levels and, through the selection of appropriate threshold values, obtaining a binary image 620 that still reflects the overall and local features of the image. For example, although the binary image 620 includes less pixel variation than grayscale image 610, the binary image 620 conveys the features of the target image sufficiently to be readable by a human or a computer. The binary image 620 can sufficiently convey a specified identifier included therein.

In order to process and analyze a binary image, the original image must first be converted into grayscale. The grayscale image is binarized to obtain a binary image. The binary image can be used for further processing of the image. For example, the binary image corresponding to an image can be more simply processed than the image or the grayscale image corresponding to the image. For example, the set properties of the image are only concerned with the locations of points having pixel values of 0 or 255 (or 0 or 1 in some implementations) multiple pixel values are no longer involved, which simplifies processing of the image, and thus reduces the volume of data processed and compressed.

In some embodiments, threshold values can be used in connection with binarizing an image. For example, in the binarization process 600 (e.g., 120 of FIG. 1), Otsu's method can be employed for the selection of threshold values, and the resulting segmenting of the grayscale image into two parts, the background part and the target (foreground) part. Otsu's method, also known as the maximum between-class variance method, is a self-adaptive thresholding method that segments the image into background and target portions according to the grayscale specifications of the image. According to Otsu's method, a greater between-class variance between the background and the target indicates a greater difference constituted between the image background and target. Foreground pixel points as a percentage of the image and the average grayscale value, and background pixel points as a percentage of the image and the average grayscale value are used to compute the variances of the foreground and background images, the corresponding grayscale value when the variance is greatest is selected as the global threshold value, and binary conversion of the image is performed based on this global threshold value.

During the process of analyzing the binary image, because the white pixels (e.g., the target pixels) are marked in the binary image, and after an image that contains the banking syndicate identifier is binarized as the target image to be detected, the banking syndicate identifier may be binarized as foreground (e.g., which has a pixel value of 1) or background (e.g., which has a pixel value of 0). Accordingly, after the binary image is obtained, a negative 630 of the binary image 620 can be generated. Both the binary image 620 and the negative image 630 can be collectively used as the target binary images to be detected.

An embodiment of a method of binary image analysis is connected domain marking, which is the foundation for binary image analysis. By marking the white pixels (e.g., the target pixels) in the binary image 620, the connected domain marking method allows each individual connected domain to form an identified block, whereupon the geometric parameters of the identified blocks can be retrieved. For example, the contour, an enclosing rectangle, a centroid, a geometric invariant, or the like can be retrieved from the identified block.

The processing associated with connected domain marking of binary images corresponds to the extraction of the set of mutually adjacent (4-adjacency or 8-adjacency) pixels having a pixel value of "1" from a dot matrix image that combines white pixels (typically expressed as "1" in binary images) and black pixels (typically expressed as"0"). Binary images include two colors, black (which has a pixel value of 0) and white (which has a pixel value of 1 or 255), which respectively serve as the background color and the target color. In some embodiments, the marking algorithm only marks the target pixels.

Referring back to 130 of FIG. 1, the connected domains of the target binary images are calibrated. The connected domains of the target binary image to be detected are used to determine a candidate connected domain. For example, the calibrated connected domains are used to determine the candidate connected domains as those connected domains among the calibrated connected domains having a number of pixels that satisfies a set threshold range.

In some embodiments, connected domain calibration is the basis for binary image analysis. The processing of connected domain marking of binary images includes the extraction of the set of mutually adjacent pixels having a pixel value of "1" from a dot matrix image that combines white pixels (typically expressed as "1" in binary images) and black pixels (typically expressed as"0"). For example, the binary image includes the colors of black (pixel value of 0) and white (pixel value of 1 or 255), which respectively serve as the background color and the target color. During connected domain calibration, the calibration algorithm only performs calibration on the target pixels (white pixels).

In some embodiments, the calibration of the connected domains uses various types (e.g., definitions) of adjacency. For example, two common types of adjacency are generally used in connection with calibration of a connected domain. The two common types of adjacency include a 4-adjacency and an 8-adjacency. 4-adjacency has a total of 4 points (e.g., top, bottom, left, and right). 8-adjacency has a total of 8 points, including points in diagonal positions (e.g., top, bottom, left, right, upper left, upper right, lower left, and lower right). Sets formed by mutually connected points at the top, bottom, left, and right, or at the top, bottom, left, right, upper left, and upper right, are calibrated as connected domains.

In some embodiments, after the intercepted area range including the banking syndicate identifier image has been binarized, the connected domain calibration is used on the binary image 620 to calibrate the connected domains in the binary image 620. For example, the calibration of connected domains is performed on the binary image 620. In some embodiments, the calibration of connected domains is performed on the binary image 620 to calibrate all connected domains having a pixel value of 1. Threshold judgment can be performed with respect to each individual calibrated connected domain. If the number of pixels of a connected domain is within a given threshold range, then the connected domain is retained. Otherwise, if the number of pixels of a connected domain is not within a given threshold range, connected domain calibration is performed on the negative image 630 of the target binary image to be detected, and threshold determination can be performed with respect to the number of pixels in the calibrated connected domains contained in the negative image 630. If the number of pixels is within the threshold range, then the connected domain is retained. If the number of pixels is not within the threshold range, then the connected domain is discarded.

In some embodiments, the number of pixels of the connected domains formed by the banking syndicate identifier image will be within a reasonable range. The reasonable range can be set as the threshold range for the connected domains of the banking syndicate identifier image.

The following may be referred to for the computation of the aforesaid threshold range of the banking syndicate identifier connected domains:

The threshold range of the banking syndicate identifier of the connected domains can be computed according to: lower limit of threshold corresponds to LowThreshold=Width×Height×lower limit coefficient; and upper limit of threshold HighThreshold=Width×Height×upper limit coefficient.

The Width and Height used in connection with computing the threshold range corresponds to the respective width and height of the retrieved predetermined area or image including the predetermined area. For example, Width and Height can be the width and height of the target image to be detected, and the lower limit coefficient and the upper limit valuation can be the empirical values of 0.011 and 0.043, respectively.

In the event that the specified identifier information being detected is not a banking syndicate identifier, a threshold range can be set based at least in part on the reasonable range into which the number of pixels of the specified identifier connected domain can fall.

Referring back to 140 of FIG. 1, image features of the candidate domain areas are retrieved and a location of the specified identifier is determined. In some embodiments, the image features of the candidate connected domains are retrieved, and the image features of the candidate connected domains are compared to the corresponding image features of the standard specified identifier image. Based on the comparison of the image features of the candidate connected domain to a corresponding image feature of the standard specified identifier image, the candidate connected domain is determined. For example, a location of the specified identifier image can correspond to the area having an identical or the closest comparison results as the location of the specified identifier image. For example, the candidate connected domain area that is most similar to the standard specified identifier image is determined to correspond to the location to the specified identifier image.

In some embodiments, the determining of the location of the specified identifier image can include the image features of the candidate banking syndicate identifier connected domain area and the standard banking syndicate identifier image, and comparing the corresponding image features of the candidate banking syndicate identifier connected domain area and the standard banking syndicate identifier image. In some embodiments, the comparing of the corresponding image features of the candidate banking syndicate identifier connected domain area and the standard banking syndicate identifier image includes using a single image feature comparison or a combined image feature comparison. In some embodiments, image features include the volume ratio of the connected domain, the major axis direction of the circumscribed ellipse of the connected domain, the outer contour shape of the connected domain, or the aspect ratio of the enclosing rectangle of the connected domain. In some embodiments, the image features correspond to image shape features. The image shape features can further include distance features, image convex and concave features, length features, or the like.

The volume ratio of the connected domain and the major axis direction of the circumscribed ellipse of the connected domain can be used as the first set of combined image features for the screening of the candidate connected domain areas of the banking syndicate identifier image.

Figure 7:
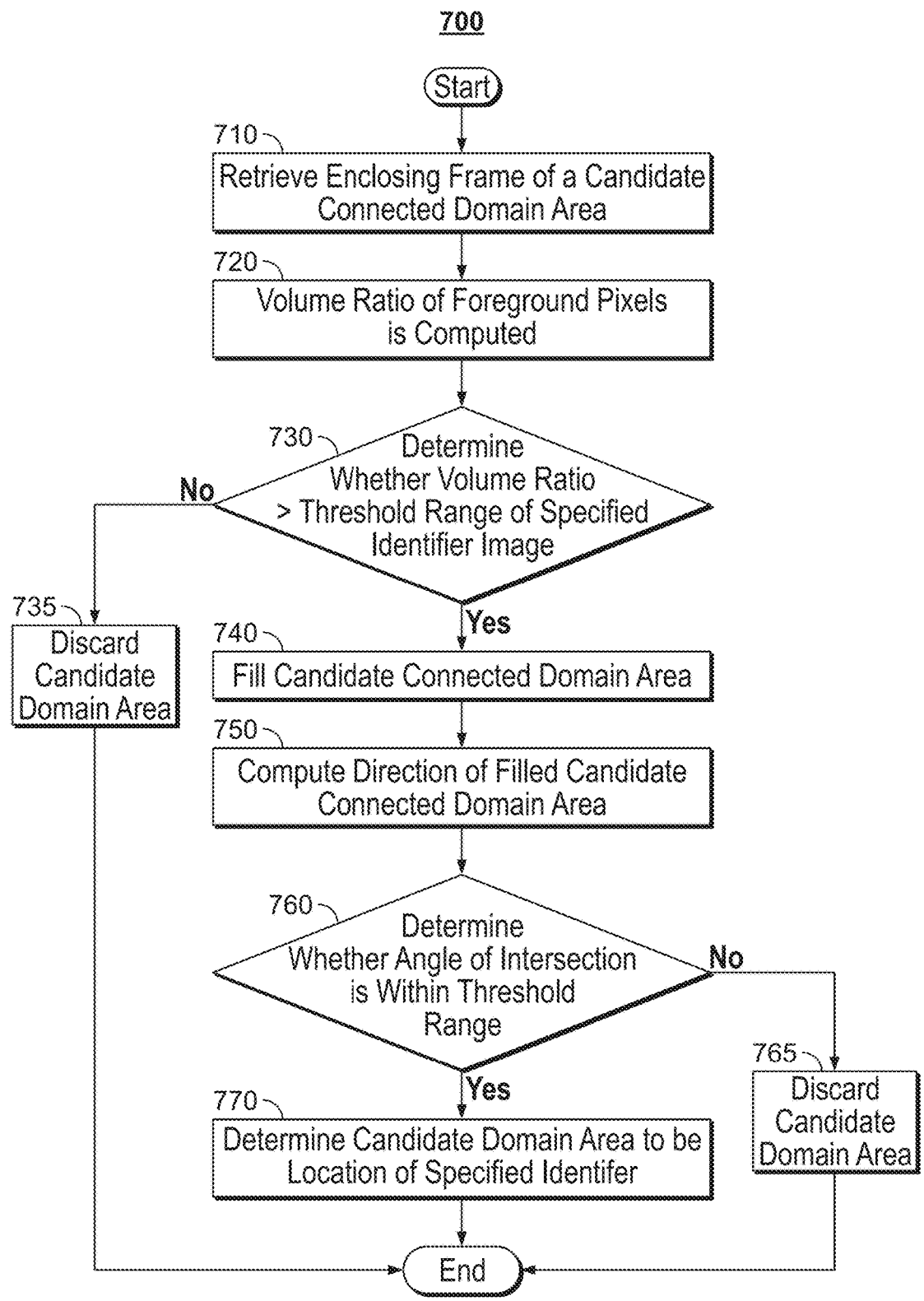
FIG. 7 is a flow chart of the first screening of the candidate connected domain in a method to detect specified identifier images in a predetermined area according to various embodiments of the present application.

FIG. 7 is a flow chart of the first screening of the candidate connected domain in a method to detect specified identifier images in a predetermined area according to various embodiments of the present application.

Referring to FIG. 7, process 700 to screen a candidate connected domain is provided. Process 700 can be implemented in connection with process 100 of FIG. 1. For example, process 700 can be implemented in connection with 140 of FIG. 1. Process 700 can be implemented by device 1000 of FIG. 10 or computer system 1100 of FIG. 11.

At 710, an enclosing frame of the candidate connected domain area is retrieved. The enclosing frame can correspond to an area of pixels that encloses the specified identifier image. For example, in an implementation in which the specified identifier image is a banking syndicate identifier, the enclosing frame can correspond to an area enclosing the banking syndicate identifier.

In some embodiments, the enclosing frame of the candidate connected domain area is retrieved using a scanning of a candidate banking syndicate identifier connected domain image. For example, the scanning of the candidate banking syndicate identifier connected domain image can include scanning inward from the outermost edge of the candidate banking syndicate identifier connected domain image and when the foreground color (white pixels) is detected, scanning is stopped, and an enclosing frame is obtained. The candidate banking syndicate identifier connected domain image can be scanned in multiple directions (e.g., horizontal and vertical). The enclosing frame is generally rectangular. Other scanning methods can be used to retrieve the enclosing frame.

At 720, a volume ratio of foreground pixels is computed. For example, the volume ratio of the foreground color pixels in the candidate connected domain within the enclosing frame and the area of the enclosing frame is computed. For example, the ratio of foreground color pixels to background color pixels or the ratio of foreground color pixels to a total number of pixels in the enclosing frame can be computed. The volume ratio of the connected domain can be obtained by tabulating the number of foreground color (white) pixels in the rectangular enclosing frame, and dividing the number of white pixels by the area of the rectangular enclosing frame.

At 730, it is determined whether the volume ratio is greater than the threshold value of the specified identifier image. In some embodiments, it is determined whether the volume ratio is greater than or equal to the threshold range of the specified identifier image.

In some embodiments, the determination of whether the volume ratio of foreground pixels is greater than the threshold range can be based on a threshold value Tsolid for the volume ratio of the standard banking syndicate identifier connected domain. For example, in some embodiments, it can be determined whether the volume ratio of the candidate connected domain conforms to the volume ratio image feature of the standard banking syndicate identifier connected domain. The volume ratio of the candidate connected domain can conform to the volume ratio image feature of the standard banking syndicate identifier connected domain if the volumes are the same or within a statistically relevant range. The threshold value Tsolid can be obtained using information associated with the standard banking syndicate identifier image. For example, the threshold value Tsolid can be obtained by retrieving the standard banking syndicate identifier image from all angles, computing a volume ratio of the standard banking syndicate identifier image with the external matrix, selecting a threshold value Tsolid, and determining whether the candidate connected domain is the banking syndicate identifier image by comparing the volume ratio of the candidate banking syndicate identifier connected domain to Tsolid.

In the event that the volume ratio of the candidate banking syndicate identifier connected domain is not greater than the threshold value (e.g., Tsolid) of the specified identifier range, at 735, the candidate domain area is discarded.

In the event that the volume ratio of the candidate banking syndicate identifier connected domain is greater than the threshold value (e.g., Tsolid), the candidate banking syndicate identifier connected domain is determined to correspond to the banking syndicate identifier connected domain. Because it is possible for non-banking syndicate identifier connected domains having feature images that are identical to the volume ratio of the standard banking syndicate identifier connected domain to be present among the candidate banking syndicate identifier connected domains, various embodiments use another image feature (e.g., the image feature of the ellipse major axis direction of the connected domain) to further confirm the candidate banking syndicate identifier. For example, in response to determining the volume ratio of the candidate banking syndicate identifier connected domain is greater than the threshold value (e.g., Tsolid), the candidate banking syndicate identifier connected domain is further analyzed or processed to confirm the candidate banking syndicate identifier. For example, the major axis of the connected domain ellipse of the candidate banking syndicate identifier connected domain can be analyzed or processed.

In the event that the volume ratio of the candidate banking syndicate identifier connected domain is greater than the threshold value (e.g., Tsolid), at 740, the candidate connected domain area is filled (e.g., filling a domain that defines an empty place such as a circle). In some embodiments, the foreground color (white) of the banking syndicate identifier candidate connected domain area is filled.

At 750, a direction of the filled candidate connected domain area is computed. For example, the direction of the filled banking syndicate identifier candidate connected domain area is determined.

In some embodiments, the direction of the filled banking syndicate identifier candidate connected domain area is computed using ellipse fitting. For example, the major axis direction of a circumscribed ellipse on the banking syndicate identifier candidate connected domain is used as the direction of the banking syndicate identifier candidate connected domain. In some embodiments, the ellipse fitting includes performing edge detection of the banking syndicate identifier candidate connected domain, recording points along the detected edge, and performing ellipse fitting of the points along the detected edge.

After the ellipse fitting major axis direction has been computed, coordinate axes are established using the lower left corner of the banking syndicate identifier candidate connected domain as the base point. The X-axis of the established coordinate axes is defined as the reference axis, and an angle of intersection is formed between the major axis of the ellipse and the X-axis. Similarly, for the standard banking syndicate identifier image, the angle of intersection formed between the ellipse major axis and the X-axis can also be computed.

At 760, it is determined whether the angle of intersection corresponding to the banking syndicate identifier candidate connected domain is within a predetermined threshold range (e.g., value) of the angle of intersection of the standard banking syndicate identifier image. The threshold range of 760 can be the same as or different from the threshold range of 730.

In some embodiments, the threshold range for the angle of intersection can be based on the elliptical fitting of the standard banking syndicate identifier image and computation of the angle of intersection of the major axis direction of this ellipse and the reference axis. In the retrieval of the banking syndicate identifier target image to be detected, because the effects of factors including the retrieval angle may be present, which can also affect the angle of the candidate connected domain, various embodiments set a threshold range for the angle of intersection based on the angle of intersection of the major axis of the ellipse and the reference axis in the standard banking syndicate identifier in order to prevent a determination of whether the banking syndicate identifier target image to be detected corresponds to the standard syndicate identifier target image from being affected by the adverse factors affecting the retrieval angle (e.g., errors inherent in the elliptical fitting of the standard banking syndicate identifier). The reference axis can be the X-axis. The above reference axis can be set based on requirements of the determination (e.g., it can also be the Y-axis, if the requirements of the determination associated with the major axis direction of the circumscribed ellipse of the connected domain can be satisfied).

In the event that the angle of intersection corresponding to the banking syndicate identifier candidate connected domain is not within the predetermined threshold value of the angle of intersection of the standard banking syndicate identifier image, at 765, the candidate domain area is discarded.

In the event that the angle of intersection corresponding to the banking syndicate identifier candidate connected domain is within the predetermined threshold value of the angle of intersection of the standard banking syndicate identifier image, at 770, the banking syndicate identifier candidate connected domain is determined to be (e.g., regarded as) the area in which the banking syndicate identifier image is located.

It should be noted that when the specified identifier has two (defined) enclosing edges (e.g., inner layer edge and outer layer edge connected domains), a second volume ratio determination can be made with respect to the banking syndicate identifier candidate connected domain image. However, the threshold value used during this second volume determination is not the Tsolid described above, but rather another threshold value Tsolid' set for the purposes of this second volume determination. The second volume determination can be made using variations of 710-770. The pixel value of the inner layer connected domain is different from the pixel value of the outer layer connected domain, and therefore a different threshold value is employed.

Process 700 is described in connection with a banking syndicate identifier candidate connected domain image. According to various embodiments, process 700 can be performed in connection with other identifier connected domain images. For example, process 700 can be performed in connection with a specified identifier other than a banking syndicate identifier.

Process 700 can be used to confirm that the banking syndicate identifier candidate connected domain image corresponds to the banking syndicate identifier image. In some embodiments, further confirmation of the banking syndicate identifier candidate connected domain image can be performed. For example, a second screening of the candidate connected domain area can be performed using the outer contour shape of the connected domain as the single condition, based on a determination that the angle of intersection of the ellipse major axis and the reference axis is within a predetermined threshold range.

Figure 8:
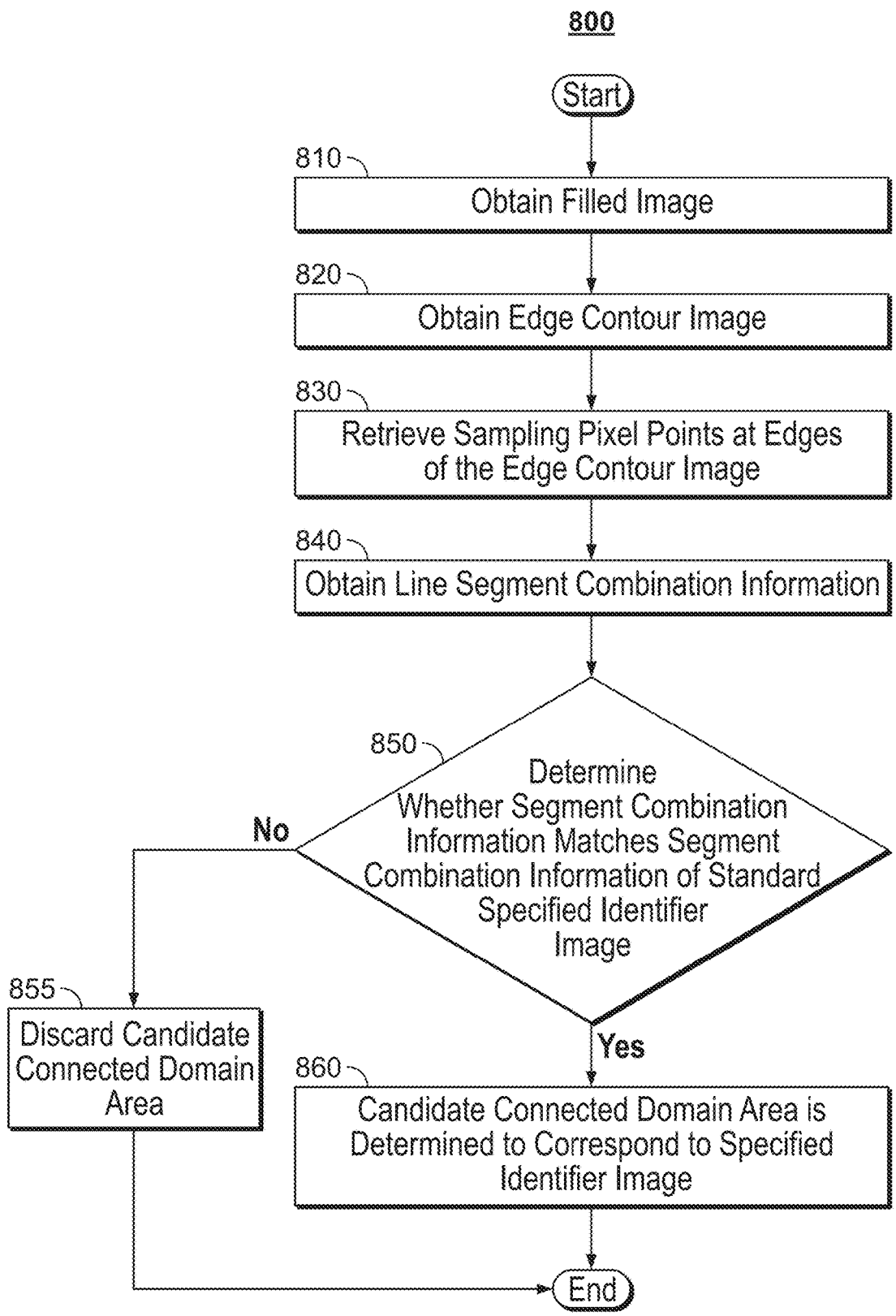
FIG. 8 is a flow chart of a second screening of a candidate connected domain in a method to detect specified identifier images in a predetermined area according to various embodiments of the present application.

FIG. 8 is a flow chart of a second screening of a candidate connected domain in a method to detect specified identifier images in a predetermined area according to various embodiments of the present application.

Referring to FIG. 8, process 800 to screen a candidate connected domain is provided. Process 800 can be implemented in connection with process 100 of FIG. 1. For example, process 800 can be implemented in connection with 140 of FIG. 1. Process 800 can be implemented by device 1000 of FIG. 10 or computer system 1100 of FIG. 11.

At 810, a filled image is obtained. In some embodiments, the filled image is obtained based on filling the candidate connected domain area. The candidate connected domain area can be filled similar to the filling of the candidate connected domain at 740 of FIG. 7.

At 820, an edge contour image is obtained. In some embodiments, the edge contour image is obtained based at least in part on detection of the edges of the filled image.

In some embodiments, after the candidate connected domain area is filled with white, the white area corresponds to the candidate connected domain area, and the edge contour image of the filled image is obtained by performing an edge detection. The edge detection can correspond to a technique that captures important features of objects in images commonly used in image processing. In various embodiments, edge detection includes differential edge detection, gradient edge detection, the Roberts edge detection operator, the Sobel edge detection operator, the Prewitt edge detection operator, and the Laplace edge detection operator, or the like. In some embodiments, the Sobel edge detection operator is used to detect the edges of the filled image. Using the Sobel edge detection operator, edges are detected primarily when extrema are reached in the edge area, based on the grayscale weighted difference of the adjacent pixel points above, below, to the left, and to the right of the pixel point; this has the effect of smoothing noise, enabling provision of more precise edge directional information. There are two Sobel operators, one for detecting horizontal edges, and the other for detecting vertical edges. In contrast to the Prewitt operator, the impact of pixel location is weighted in the Sobel operators, which can reduce the degree of edge blur and produce better results. According to varying requirements of various embodiments, other edge detection operators can be used to detect the edges of the filled image.

At 830, sampling pixel points at edges of the edge contour image are retrieved. For example, separate retrieval of sampling pixel points for the top and bottom edges and left and right edges of the edge contour image is performed. Sampling pixel points for the top and bottom edges and sampling pixel points for the left and right edges are selected such that the selected sampling pixel points are within a set threshold range.

In some embodiments, retrieval of the sampling pixel points at edges of the edge contour image includes scanning the edge contour image. For example, the edge contour image is scanned to sample the sampling pixel points for the top and bottom edges and the left and right edges in the edge contour image. In the event that the specified identifier corresponds to a banking syndicate identifier, the edge contour of the filled image can be a rectangular image, the top and bottom edges and the left and right edges of the rectangular image are separately scanned, and the same scanning process can be used for scanning the top and bottom edges and the left and right edges.

The retrieval of sampling pixel points can include sequentially scanning edges of the rectangular image and selecting pixel points having two points of intersection between the scanning line and the edge image. The distances between the selected pixel points can be computed and (all) the maximum values maxDist between the pixel points are recorded and used as the sampling pixel points. Because the rectangular image can include jagged edges in the edges of the rectangular image, a maximum distance threshold range is set for the selection of sampling pixel points. The threshold range can be set at maxDist±maxDist×5%. Pixel points within this threshold range are selected as the sampling pixel points, and (all) pixel points outside this threshold range are discarded. Accordingly, sampling pixel points for the top and bottom edges of the rectangular image can be obtained. In various embodiments, sampling pixel points for the left and right edges can be obtained in the same manner.

At 840, line segment combination information of the edge contour image is obtained. In some embodiments, the line segment combination information of the edge contour image is obtained by fitting the selected sampling pixel points.

The selected sampling pixel points can be fitted according to polynomial curve fitting. For example, the sampling pixel points of the four edges of the candidate connected domain rectangular image selected at 830 can be fitted using polynomial curve fitting methods to obtain four line segments. The four line segments obtained by fitting the sampling pixel points can be combined to obtain four vertices. According to various implementations, different fitting methods or computation methods can be used to perform fitting of the sampling pixel points according to the specific identifier to be detected.

At 850, it is determined whether the segment combination information matches the segment combination information of the standard specified identifier image. For example, it is determined whether the line segment combination information of the candidate connected domain area is identical to the line segment combination information of the standard specified identifier image.

The determination of whether the line segment combination information of the candidate connected domain area matches the line segment combination information of the standard specified identifier image can include regarding the line segment combination information obtained at 840 (e.g., the four line segments and four vertices obtained by combining the four line segments obtained at 840), and comparing the four line segments and four vertices to the image of the banking syndicate identifier of the standard bank card. If the four line segments and four vertices are identical (or within a statistically relevant similarity threshold) to the banking syndicate identifier, then the banking syndicate identifier candidate connected domain is deemed to be the banking syndicate identifier image.

In the event that the segment combination information does not match the segment combination information of the standard specified identifier image, at 855, the candidate domain area is discarded. In some embodiments, an indication that the specified identifier image area has not been detected can be output. The indication can indicate a failure of the detection of the specified identifier image area.

In the event that the segment combination information matches the segment combination information of the standard specified identifier image, at 860, the candidate domain area is determined to correspond to the specified identifier image.

In the event that the candidate banking syndicate identifier is detected, the system can output the four corners of the bank syndicate indicator. If the combined information obtained through detection includes vertex information for more or fewer than 4 vertices, then the candidate area can be determined to not correspond to the banking syndicate logo. If the detected banking syndicate identifier candidate area is empty, detection of the banking syndicate identifier fails. The user can be provided with an indication that notifies of the failure to detect the banking syndicate identifier. In some embodiments, if the number of detected banking syndicate identifier areas is greater than one, then a user can be prompted to select the banking syndicate identifier among a set of the detected banking syndicate identifier areas. For example, all candidate areas can be provided to the user, and the user can input a selection of a banking syndicate identifier area autonomously.

Figure 9:
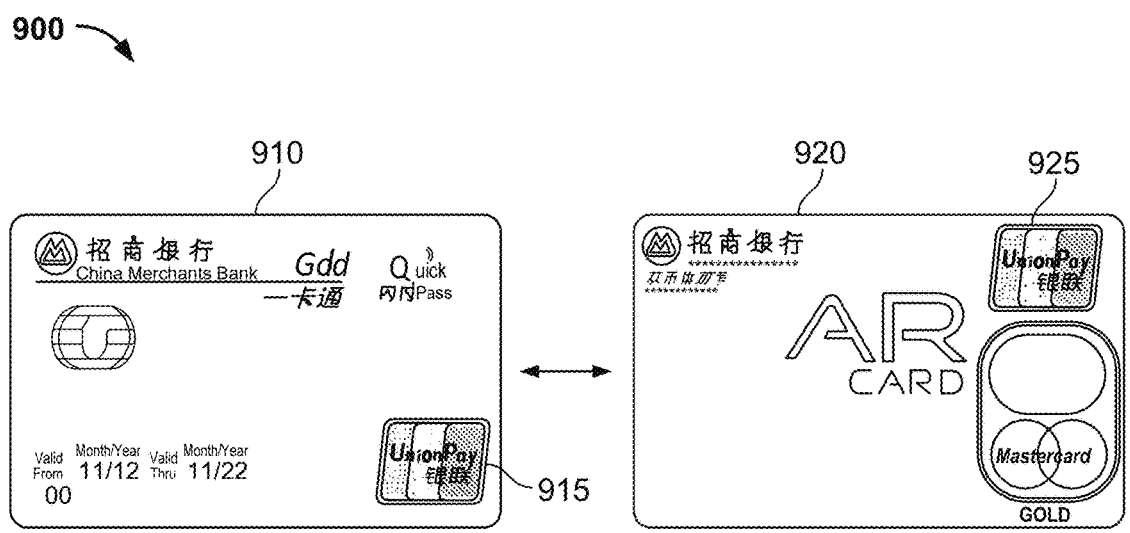
FIG. 9 is a schematic diagram of a detection of an upper placement and a lower placement of a banking syndicate identifier in a method to detect specified identifier images in a predetermined area according to various embodiments of the present application.

FIG. 9 is a diagram illustrating a detection of an upper placement and a lower placement of a banking syndicate identifier in a method to detect specified identifier images in a predetermined area according to various embodiments of the present application.

Referring to FIG. 9, examples of bank cards 900 including banking syndicate identifiers are provided. Bank card 910 includes a banking syndicate identifier 915 placed according to a lower placement format. Bank card 920 includes a banking syndicate identifier 925 placed according to an upper placement format. Banking syndicate identifier 915 or banking syndicate identifier 925 can be detected in connection with process 100 of FIG. 1, process 500 of FIG. 5, process 700 of FIG. 7, or process 800 of FIG. 8. Banking syndicate identifier 915 or banking syndicate identifier 925 can be detected by device 1000 of FIG. 10 or computer system 1100 of FIG. 11.

The above is a description of specified identifier detection using the example of banking syndicate identifiers. In some embodiments, the banking syndicate identifiers include various image features. The image features can include shape features, including such properties as a parallelogram and four vertices. If the specified identifier is text, a product identifier, or a corporate logo, the specified identifier can be detected using the image features according to various embodiments of the present disclosure.

For example, the logos of the various issuing banks are described using the example of the China Merchants Bank logo. Refer to FIG. 3, region [number and label it in figure] the image features of the China Merchants Bank logo image include circular, the letter M and the various vertices of the letter M, triangular, or convex-concave properties, or the like, and the various detection methods according to some embodiments can be used to perform detection of the logo.

After the banking syndicate identifier has been detected, the affine transformation matrix of the banking syndicate identifier image can be computed based on information concerning the four vertices of the banking syndicate identifier and the vertex information of the standard banking syndicate information; other information on the bank card can be computed based on the affine transformation matrix.

Assuming that the coordinates of the four vertices of a standard banking syndicate identifier are [x1, y1], [x2, y2], [x3, y3], and [x4, y4], and the coordinates of the four vertices in the detected candidate connected domain image are [X1, Y1], [X2, Y2], [X3, Y3], and [X4, Y4], in some embodiments, based on correspondences between the four points, the affine transformation (projective) matrix M can be computed, and an affine transformed image can be computed for each pixel point of the detected image. The visual effect in which this image is located is a positive viewing angle image. Based on specifications associated with the bank card, any information about the bank card can be obtained. For example, if information associated with the card number on the bank card needs to be detected, the pixel points of the card number can be multiplied by matrix M to obtain a positive viewing angle image of the card number, and thereby obtain accurate card number information.

In the event that information on the object (e.g., bank card) is detected, or the specified identifier is detected from the predetermined area of the object, the object or the user associated with the object can be authenticated. For example, the information detected from the object or the specified identifier can be used to determine that the object is authentic (e.g., is not fraudulent) and the user can be authenticated. The user or the object can be authenticated in connection with a login to a web server (e.g., an e-commerce service, or the like) or in connection with an online transaction. In some embodiments, in response to identifying (e.g., detecting) the specified identifier (e.g., the banking syndicate identifier), the object (e.g., the bank card) or the user associated therewith, is authorized to perform a transaction on an e-commerce platform.

Figure 10:
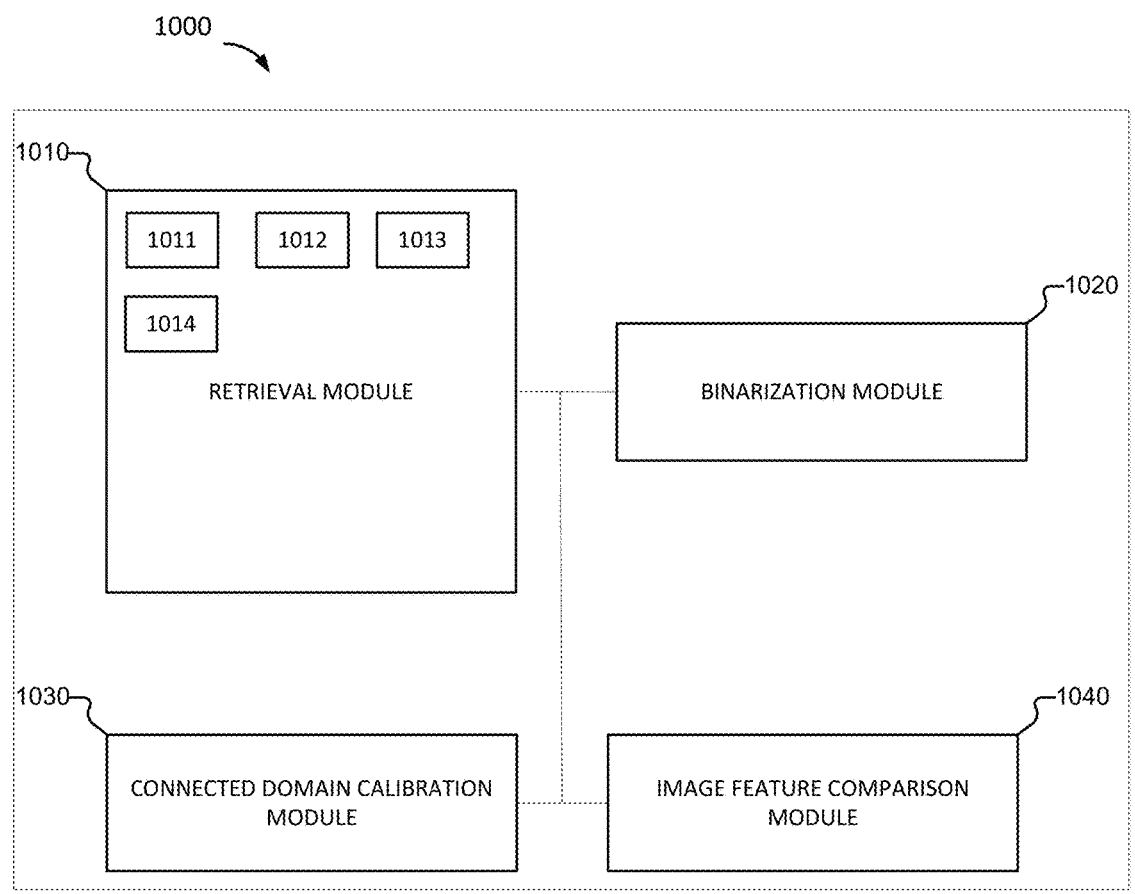
FIG. 10 is a structural block diagram of a device configured to detect specified identifier images in a predetermined area according to various embodiments of the present application.

FIG. 10 is a structural block diagram of a device configured to detect specified identifier images in a predetermined area according to various embodiments of the present application.

Referring to FIG. 10, device 1000 configured to detect a specified identifier image is provided. In some embodiments, device 1000 can be, or otherwise integrated with, a mobile terminal such as a mobile phone, a laptop, a tablet, or the like. Device 1000 can implement process 100 of FIG. 1, process 500 of FIG. 5, process 700 of FIG. 7, or process 800 of FIG. 8.

Device 1000 includes a retrieval module 1010, a binarization module 1020, a connected domain calibration module 1030, and an image feature comparison module 1040.

The retrieval module 1010 is configured to retrieve an image from the predetermined area or image including this predetermined area. The retrieved image can serve as the target image to be detected. The retrieval module 1010 can retrieve the image from an object such as a bank card, a document, or the like. The retrieval module 1010 can retrieve the image by capturing an image of the object. The retrieval module 1010 can extract the image from an image or other electronic representation (e.g., a file) corresponding to the object. For example, the retrieval module 1010 can parse an image or other electronic representation corresponding to the object to retrieve the image from the predetermined area.

The binarization module 1020 is configured to perform binarization of the target image to be detected. The binarization module 1020 obtains a binary image and a negative image of the binary image based on the binarization of the target image to be detected. For example, the binarization module 1020 obtains the binary image (and a negative image of the binary image) by computing a binary representation of the target image to be detected. The binary image associated with the target image to be detected and the negative image of the binary image can be collectively referred to as the target binary image to be detected.

The connected domain calibration module 1030 is configured to calibrate the connected domains of the target binary image to be detected, and to use the connected domains among the calibrated connected domains having a number of pixels that satisfies the set threshold range as the candidate connected domains.

The image feature comparison module 1040 can be configured to successively retrieve the image features of the candidate connected domains, to compare the image features of the candidate connected domains to the corresponding image features of the standard specified identifier image, and to determine a location of the specified identifier image. In some embodiments, the image feature comparison module 1040 determines the location of the specified identifier image by regarding the connected domain having identical or the closest comparison results as the location of the specified identifier image.

The retrieval module 1010 can include a preview image retrieval sub-module 1011, a computation sub-module 1012, a framing sub-module 1013, and an interception sub-module 1014, The preview image retrieval sub-module 1011 is configured to retrieve preview images of the predetermined area or image including the predetermined area.

The computation sub-module 1012 is configured to compute the area range of the preview image. The computation sub-module 1012 can obtain the virtual frame parameters for the obtained preview image based on the actual dimension parameters of the predetermined area and the resolution parameter of the preview image.

Based on the actual dimensions of the predetermined area or image including the predetermined area, the computation sub-module 1012 can determine whether the product of multiplying the height of the preview image by the width of the predetermined area or image including the predetermined area is greater than the product of multiplying the width of the preview image by the height of the predetermined area or image including the predetermined area.

If the product of multiplying the height of the preview image by the width of the predetermined area or image including the predetermined area is greater than the product of multiplying the width of the preview image by the height of the predetermined area or image including the predetermined area, then the width of the virtual frame corresponds to the width of the predetermined area or image including the predetermined area multiplied by the height of the preview image divided by the actual height of the predetermined area or image containing the predetermined area multiplied by the ratio of the virtual frame to the preview image; and the height of the virtual frame corresponds to the height of the preview image multiplied by the ratio of the virtual frame to the preview image.

If the product of multiplying the height of the preview image by the width of the predetermined area or image including the predetermined area is not greater than the product of multiplying the width of the preview image by the height of the predetermined area or image including the predetermined area, then the width of the virtual frame corresponds to the width of the preview image multiplied by the ratio of the virtual frame to the preview image; the height of the virtual frame corresponds to the height of the predetermined area or image including the predetermined area multiplied by the width of the preview image divided by the width of the predetermined area or image including the predetermined area multiplied by the ratio of the virtual frame to the preview image.

In some embodiments, the top border of the virtual frame corresponds to one half of the difference between the height of the display screen and the height of the virtual frame. In some embodiments, the bottom border of the virtual frame corresponds to one-half of the sum of the height of the display screen and the height of the virtual frame. In some embodiments, the left border of the virtual frame is one half of the difference between the width of the display screen and the width of the virtual frame. In some embodiments, the right border of the virtual frame is one-half of the sum of the width of the display screen and the width of the virtual frame.

The framing sub-module 1013 is configured to frame the preview image in the area range, and retrieve the predetermined area or image including the predetermined area, and use the image within this framed area range as the target image to be detected.

The interception sub-module 1014 is configured to intercept the area range including the specified identifier image. The interception sub-module 1014 can be used based on the location information of the specified identifier image in the predetermined area or image including the predetermined area to intercept the area range containing the specified identifier image, to serve as the target image to be detected. The specified location information in the interception unit can correspond to the location information of the specified identifier image in the predetermined area or image including the predetermined area set in advance. As an example, in the event that a banking syndicate identifier on a bank card corresponds to the specified identifier, the standard bank dimension parameters can be determined based at least in part on volume 3, "Card Bin Number and Identifier Rules," of the "Bank Card Service Operation Rules." In some embodiments, the specified location of the banking syndicate identifier is in the upper right or lower right corner of the bank card face.

In some embodiments, the interception sub-module 1014 can include an establishing sub-module, a traversal sub-module, and a target image to be detected determination sub-module.

The establishing sub-module is configured to establish a standard image template of the predetermined area or image including the predetermined area.

The traversal sub-module is configured to traverse the standard image template based on the predetermined area or image including the predetermined area and retrieve the location information of the specified identifier image in the predetermined area or image including the predetermined area. The traversal sub-module can retrieve the location information according to correspondences between the standard image template and the predetermined area or image including the predetermined area.

The target image to be detected determination sub-module is configured to intercept an image area containing the specified identifier contained in the predetermined area or image containing the predetermined area. For example, the target image to be detected determination sub-module can intercept the image area containing the specified identifier contained in the predetermined area or image containing the predetermined area based on the location information retrieved by the traversal sub-module.

In some embodiments, the upper limit value of the threshold range used by the connected domain calibration module 1030 in connection with determining the candidate connected domains is the product of multiplying the width, height, and upper limit coefficient of the predetermined area or image including the predetermined area. In some embodiments, the lower limit value of the threshold range used by the connected domain calibration module 1030 in connection with determining the candidate connected domains is the product of multiplying the width, height, and lower limit coefficient of the predetermined area or image including the predetermined area.

In some embodiments, the image feature comparison module 1040 comprises a combined image feature screening sub-module or a single image feature screening sub-module. The image feature comparison module 1040 can use a single image feature comparison or a combined image feature comparison. In some embodiments, the image features include the volume ratio of the connected domain, the major axis direction of the circumscribed ellipse of the connected domain, the outer contour of the connected domain, the aspect ratio of the enclosing rectangle of the connected domain, the like, or any combination thereof.

The combined image feature screening sub-module can include an enclosing frame retrieval sub-module, a volume ratio computation sub-module, volume ratio threshold determining sub-module, a filling computation sub-module, and an angle of intersection determining sub-module. The combined image feature screening sub-module can be implemented to perform process 700 of FIG. 7.

The enclosing frame retrieval sub-module can be configured to retrieve an enclosing frame of a candidate connected domain area. The enclosing frame can correspond to an area of pixels that encloses the specified identifier image. For example, in an implementation in which the specified identifier image is a banking syndicate identifier, the enclosing frame can correspond to an area enclosing the banking syndicate identifier. The enclosing frame retrieval sub-module can be implemented to perform 710 of process 700.

In some embodiments, the enclosing frame retrieval sub-module can retrieve the enclosing frame of the candidate connected domain area using a scanning of a candidate banking syndicate identifier connected domain image. For example, the scanning of the candidate banking syndicate identifier connected domain image can include scanning inward from the outermost edge of the candidate banking syndicate identifier connected domain image and when the foreground color (white pixels) is detected, scanning is stopped, and an enclosing frame is obtained. The candidate banking syndicate identifier connected domain image can be scanned in multiple directions (e.g., horizontal and vertical). The enclosing frame is generally rectangular. Other scanning methods can be used to retrieve the enclosing frame.

The volume ratio computation sub-module is configured to compute a volume ratio of the foreground color pixels. The volume ratio computation sub-module is configured to compute a volume ratio of the foreground color pixels within the enclosing frame to the area of the enclosing frame. The volume ratio computation sub-module can compute the volume ratio of the connected domain by tabulating the number of foreground color (white) pixels in the rectangular enclosing frame, and dividing the number of white pixels by the area of the rectangular enclosing frame. The volume ratio computation sub-module can be implemented to perform 720 of process 700.

The volume ratio threshold determining sub-module is configured to determine whether the volume ratio is greater than a threshold range corresponding to the specified identifier image. The threshold range corresponding to the specified identifier image can be preset. In some embodiments, the determination of whether the volume ratio of foreground pixels is greater than the threshold range can be based on a threshold value Tsolid for the volume ratio of the standard banking syndicate identifier connected domain. In the event that the volume ratio of the candidate banking syndicate identifier connected domain is not greater than the threshold value (e.g., Tsolid) of the specified identifier range, the candidate domain area is discarded. In the event that the volume ratio of the candidate banking syndicate identifier connected domain is greater than the threshold value (e.g., Tsolid), the candidate connected domain is filled. The volume ratio threshold determining sub-module can be implemented to perform 730 of process 700.

The filling computation sub-module is configured to compute the major axis direction of the circumscribed ellipse of the filled said candidate connected domain area. The filling computation sub-module can determine the direction of the filled banking syndicate identifier candidate connected domain area. The filling computation sub-module can be implemented to perform 740 and/or 750 of process 700.

The angle of intersection determining sub-module is configured to determine whether the angle of intersection is within a predetermined threshold range. For example, the angle of intersection determining sub-module is configured to determine whether the angle of intersection corresponding to the banking syndicate identifier candidate connected domain is within a predetermined threshold value of the angle of intersection of the standard banking syndicate identifier image. In the event that the angle of intersection corresponding to the banking syndicate identifier candidate connected domain is not within the predetermined threshold value of the angle of intersection of the standard banking syndicate identifier image, the candidate domain area is discarded. In the event that the angle of intersection corresponding to the banking syndicate identifier candidate connected domain is within the predetermined threshold value of the angle of intersection of the standard banking syndicate identifier image, the banking syndicate identifier candidate connected domain is determined to be (e.g., regarded as) the area in which the banking syndicate identifier image is located. The angle of intersection determining sub-module can implement 760, 765, and/or 770 of process 700.

In some embodiments, the single image feature screening sub-module can include a filling sub-module, an edge contour retrieval sub-module, a sampling sub-module, a sampling pixel point fitting sub-module, and a segment combination determining sub-module. In some embodiments, the single image feature screening sub-module is used to implement process 800 of FIG. 8.

The filling sub-module is configured to fill in the candidate connected domain area to obtain a filled image. The filling sub-module can implement 810 of process 800.

The edge contour retrieval sub-module is configured to obtain an edge contour image. For example, the edge contour retrieval sub-module can obtain the edge contour image of the filled image based on the detected edges of said filled image. The edge contour retrieval sub-module can implement 820 of process 800.

The sampling sub-module is configured to retrieve sampling pixel points at edges of the edge contour image. The sampling sub-module can separately retrieve sampling pixel points for the top and bottom edges and sampling pixel points for the left and right edges of said edge contour image. The sampling sub-module can select the sampling pixel points for the top and bottom edges and sampling pixel points for the left and right edges within a set threshold range. The sampling sub-module can implement 830 of process 800.

The sampling pixel point fitting sub-module is configured to obtain line segment combination information of the edge contour image. The sampling pixel point fitting sub-module can separately retrieve sampling pixel points for the top and bottom edges and left and right edges of said edge contour image, and select the sampling pixel points for the top and bottom edges and sampling pixel points for the left and right edges within a set threshold range. The sampling pixel point fitting sub-module can implement 840 of process 800.

The segment combination determining sub-module is configured to determine whether the segment combination information matches the segment combination information of the standard specified identifier image. In some embodiments, the segment combination determining sub-module determines whether the segment combination information and intersection point location information are identical to the segment combination information and intersection point location information of the standard specified identifier image. The segment combination determining sub-module implements 850, 855, and/or 860 of process 800.

In the event that the segment combination information does not match the segment combination information of the standard specified identifier image, the segment combination determining sub-module discards the candidate domain area. In some embodiments, the segment combination determining sub-module provides an indication that the specified identifier image area has not been detected. The indication can indicate a failure of the detection of the specified identifier image area.

In the event that the segment combination information matches the segment combination information of the standard specified identifier image, the segment combination determining sub-module determines that the candidate domain area corresponds to the specified identifier image.

In some embodiments, the sampling sub-module includes a scanning sub-module and a distance threshold value determining sub-module.

The scanning sub-module of the sampling sub-module is configured to scan for the presence of two points of intersection with the filled image as the condition, and to use the identified intersection points as the sampling pixel points.

The distance threshold value determining sub-module of the sampling sub-module is configured to determine whether the distance between the top and bottom edges and the distance between the left and right edges of the retrieved sampling pixel points are within the set threshold range. If the distance between the top and bottom edges and the distance between the left and right edges of the retrieved sampling pixel points are within the set threshold range, then the pixel points are selected. If the distance between the top and bottom edges and the distance between the left and right edges of the retrieved sampling pixel points are not within the set threshold range, then pixel points are discarded. The distance threshold value determining sub-module uses the range of threshold values that can correspond to maxDist±maxDist×5%, where maxDist is the maximum distance between two sampling pixel points.

In some embodiments, device 1000 further comprises an affine transformation module configured to compute the affine transformation matrix based on the location information of the specified identifier in the predetermined area or image including the predetermined area, and the location information of each intersection point. In some embodiments, device 1000 further comprises a related information retrieval module configured to retrieve related information based on the affine transformation matrix.

The modules (or sub-modules) described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

Figure 11:
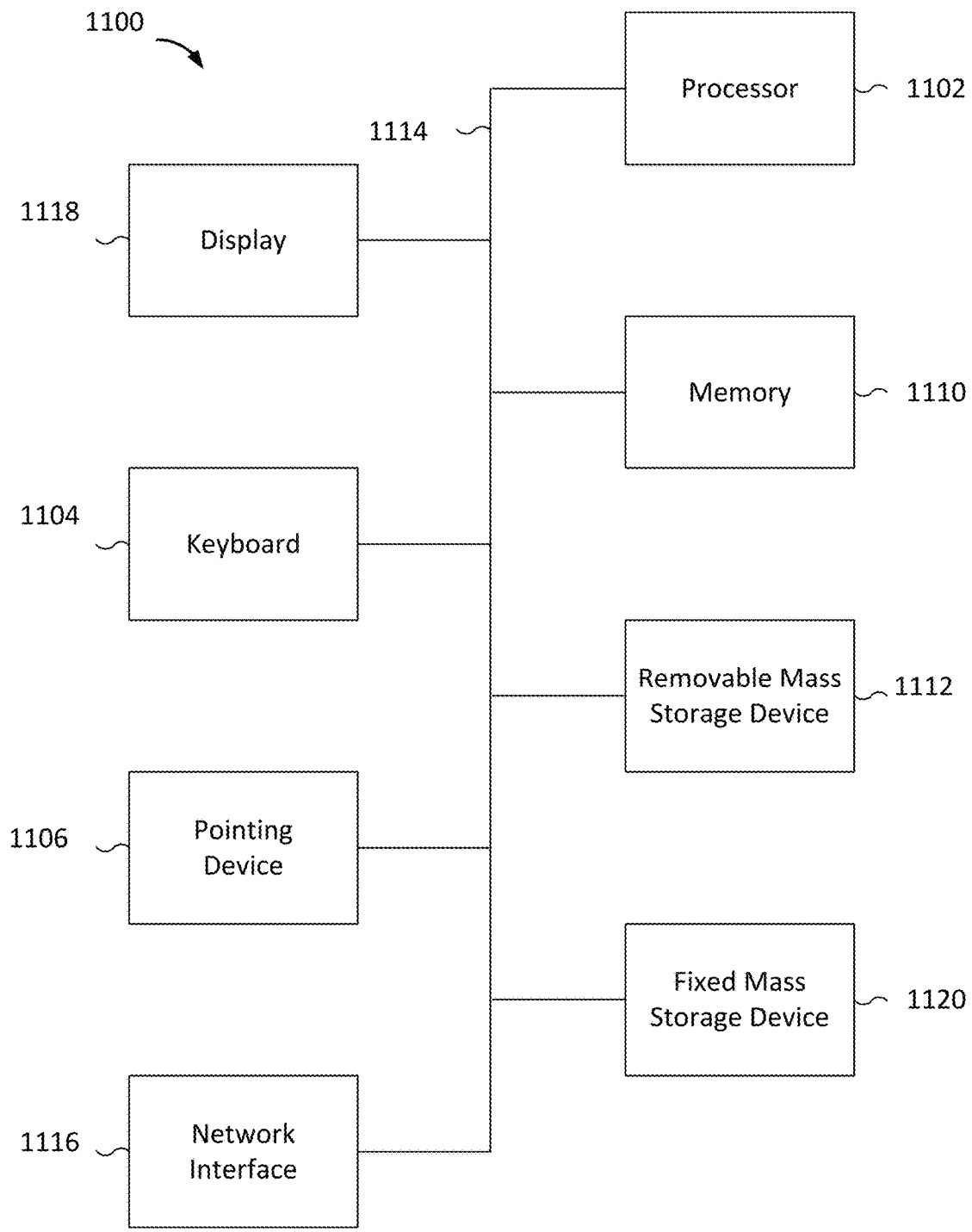
FIG. 11 is a functional diagram of a computer system for detecting a specified identifier according to various embodiments of the present application.

FIG. 11 is a functional diagram of a computer system for detecting a specified identifier according to various embodiments of the present application.

Referring to FIG. 11, a computer system 1100 for detecting a specified identifier is displayed. As will be apparent, other computer system architectures and configurations can be used to detect a specified identifier. Computer system 1100, which includes various subsystems as described below, includes at least one microprocessor subsystem (also referred to as a processor or a central processing unit (CPU)) 1102. For example, processor 1102 can be implemented by a single-chip processor or by multiple processors. In some embodiments, processor 1102 is a general purpose digital processor that controls the operation of the computer system 1100. Using instructions retrieved from memory 1110, the processor 1102 controls the reception and manipulation of input data, and the output and display of data on output devices (e.g., display 1118).

Processor 1102 is coupled bi-directionally with memory 1110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1102. Also as is well known in the art, primary storage typically includes basic operating instructions, program code, data, and objects used by the processor 1102 to perform its functions (e.g., programmed instructions). For example, memory 1110 can include any suitable computer-readable storage media, described below, depending on whether, for example, data access needs to be bi-directional or uni-directional. For example, processor 1102 can also directly and very rapidly retrieve and store frequently needed data in a cache memory (not shown). The memory can be a non-transitory computer-readable storage medium.

A removable mass storage device 1112 provides additional data storage capacity for the computer system 1100, and is coupled either bi-directionally (read/write) or uni-directionally (read only) to processor 1102. For example, storage 1112 can also include computer-readable media such as magnetic tape, flash memory, PC-CARDS, portable mass storage devices, holographic storage devices, and other storage devices. A fixed mass storage 1120 can also, for example, provide additional data storage capacity. The most common example of mass storage 1120 is a hard disk drive. Mass storage device 1112 and fixed mass storage 1120 generally store additional programming instructions, data, and the like that typically are not in active use by the processor 1102. It will be appreciated that the information retained within mass storage device 1112 and fixed mass storage 1120 can be incorporated, if needed, in standard fashion as part of memory 1110 (e.g., RAM) as virtual memory.

In addition to providing processor 1102 access to storage subsystems, bus 1114 can also be used to provide access to other subsystems and devices. As shown, these can include a display monitor 1118, a network interface 1116, a keyboard 1104, and a pointing device 1106, as well as an auxiliary input/output device interface, a sound card, speakers, and other subsystems as needed. For example, the pointing device 1106 can be a mouse, stylus, track ball, or tablet, and is useful for interacting with a graphical user interface.

The network interface 1116 allows processor 1102 to be coupled to another computer, computer network, or telecommunications network using a network connection as shown. For example, through the network interface 1116, the processor 1102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1102 can be used to connect the computer system 1100 to an external network and transfer data according to standard protocols. For example, various process embodiments disclosed herein can be executed on processor 1102, or can be performed across a network such as the Internet, intranet networks, or local area networks, in conjunction with a remote processor that shares a portion of the processing. Additional mass storage devices (not shown) can also be connected to processor 1102 through network interface 1116.

An auxiliary I/O device interface (not shown) can be used in conjunction with computer system 1100. The auxiliary I/O device interface can include general and customized interfaces that allow the processor 1102 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 11 is but an example of a computer system suitable for use with the various embodiments disclosed herein. Other computer systems suitable for such use can include additional or fewer subsystems. In addition, bus 1114 is illustrative of any interconnection scheme serving to link the subsystems. Other computer architectures having different configurations of subsystems can also be utilized.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

In one typical configuration, computer equipment comprises one or more processors (CPUs), input/output interfaces, network interfaces, and internal memory.

Internal memory may include non-permanent memory, random access memory (RAM) and/or non-volatile memory contained in computer-readable media, such as read-only memory (ROM) or flash memory (flash RAM). Internal memory is an example of a computer-readable medium.

Computer-readable media include permanent, non-permanent, mobile, and non-mobile media that can be used to store information by any method or technology. The information can be computer-readable commands, data structures, program modules, or other data. Examples of computer storage media include but are not limited to phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk read-only memory (CD-ROM), digit multifunction disc (DVD) or other optical storage, magnetic cassettes, magnetic tape or magnetic disc storage, or other magnetic storage equipment or any other non-transmission media that can be used to store information that is accessible to computers. As defined in this document, computer-readable media does not include temporary computer-readable media (transitory media), such as modulated data signals and carrier waves.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    obtaining, by one or more processors, a target image;
    binarizing, by the one or more processors, the target image to obtain a target binary image;
    determining a plurality of areas of the target binary image;
    obtaining, by the one or more processors, a set of one or more image features of one or more of the plurality of areas of the target binary image;
    comparing at least one of the set of one or more image features to image features of a standard specified identifier image; and
    determining, by the one or more processors, at least one of the plurality of areas of the target binary image as a location of the standard specified identifier image based at least in part on the a result of the comparing of the at least one of the set of one or more image features to the image features of the standard specified identifier image.

2. The method of claim 1, wherein the target binary image to be detected corresponds to a binary image of the target image to be detected and a negative image of the binary image.

3. The method of claim 1, wherein the determining the plurality of areas of the target binary image comprises calibrating the plurality of areas of the target binary image.

4. The method of claim 1, wherein the plurality of areas of the target binary image correspond to connected domains that have a number of pixels that satisfy a threshold value.

5. The method of claim 1, wherein the at least one of the plurality of areas of the target binary image determined as the location of the standard specified identifier image corresponds to a domain having a value of a similarity relative to the standard specified identifier image that is equal to or greater than a preset similarity threshold.

6. The method of claim 1, wherein obtaining the target image comprises:
    retrieving a preview image of an image associated with a predetermined area;
    determining an area range of the preview image;
    framing the preview image within the area range; and
    determining the preview image framed within the area range to be the target image.

7. The method of claim 6, wherein the determining of the area range of the preview image includes obtaining a virtual frame parameter of the framed preview image based at least in part on a size parameter of the predetermined area and a resolution ratio parameter of the preview image.

8. The method of claim 1, wherein obtaining the target image comprises:
    intercepting an area range including the standard specified identifier image to serve as the target image based at least in part on specified location information of the standard specified identifier image in a predetermined area or predetermined area image.

9. The method of claim 8, wherein the specified location information corresponds to a position at which the standard specified identifier image is located in the predetermined area or predetermined area image, wherein the position at which the standard specified identifier image is located in the predetermined area is set according to one or more standard specifications associated with the standard specified identifier image.

10. The method of claim 9, wherein a specified location corresponding to the specified location information is located in an upper right corner, a lower right corner, an upper left corner, or a lower left corner of the predetermined area or image including the predetermined area.

11. The method of claim 8, wherein the intercepting of the area range including the standard specified identifier image to serve as the target image comprises:
    establishing a standard image template of the predetermined area or image including the predetermined area;
    traversing the standard image template, and retrieving location information associated with the standard specified identifier image in the predetermined area or image including the predetermined area based on correspondences between the standard image template and the predetermined area or image including the predetermined area; and
    determining the target image based on retrieved location information.

12. The method of claim 1, wherein the plurality of areas of the target binary image correspond to connected domains that have a number of pixels that satisfy a threshold value, an upper limit value of the threshold value corresponds to a product of multiplying a width, a height, and an upper limit coefficient of the retrieved target image, and wherein a lower limit value of the threshold value corresponds to a product of multiplying the width, the height, and a lower limit coefficient of the retrieved target image.

13. The method of claim 1, wherein the comparing the at least one of the set of one or more image features to image features of the standard specified identifier image comprises:
    performing a single image feature comparison or a combined image feature comparison on image features corresponding to the plurality of candidate connected domains and image features of the standard specified identifier image, wherein image features include a volume ratio of the corresponding connected domain, a major axis direction of a circumscribed ellipse of the corresponding connected domain, an outer contour of the corresponding connected domain, or an aspect ratio of an enclosing rectangle of the corresponding connected domain.

14. The method of claim 1, wherein the standard specified identifier image corresponds to a logo graphic of a banking syndicate or bank card issuer.

15. The method of claim 1, wherein the obtaining the target image comprises capturing an image of an object using a camera connected to a device, and extracting the target image from the image of the object using one or more processors.

16. The method of claim 1, wherein the obtaining the target image comprises connecting to one or more servers via a network, and receiving the target image from the one or more servers, wherein the target image is extracted from an image of an object that was captured using a camera connected to a device and that was communicated to the one or more services by the device.

17. The method of claim 1, further comprising:
  determining, by the one or more processors, whether the set of one or more image features of one or more of the plurality of areas of the target binary image match corresponding one or more standard image features in the standard specified identifier image, wherein the target image is extracted from an image of an object that was captured using a camera connected to a device; and
  in the event that the set of one or more image features of one or more of the plurality of areas of the target binary image are determined to match the corresponding one or more standard image features in the standard specified identifier image, deeming the object that was captured using the camera to be authentic.

18. The method of claim 1, further comprising:
  determining, by the one or more processors, whether the set of one or more image features of one or more of the plurality of areas of the target binary image match corresponding one or more standard image features in the standard specified identifier image, wherein the target image is extracted from an image of an object that was captured using a camera connected to a device; and
  in the event that the set of one or more image features of one or more of the plurality of areas of the target binary image are determined to match the corresponding one or more standard image features in the standard specified identifier image, using the object that was captured using the camera in connection with authenticating a user associated with the object.

19. A device, comprising:
  at least one processor configured to:
    obtain, by one or more processors, a target image;
    binarize, by the one or more processors, the target image to obtain a target binary image;
    determine a plurality of areas of the target binary image;
    obtain, by the one or more processors, a set of one or more image features of one or more of the plurality of areas of the target binary image;
    compare at least one of the set of one or more image features to image features of a standard specified identifier image; and
      determine, by the one or more processors, at least one of the plurality of areas of the target binary image as a location of the standard specified identifier image based at least in part on the a result of the comparing of the at least one of the set of one or more image features to the image features of the standard specified identifier image; and
  a memory coupled to the at least one processor and configured to provide the at least one processor with instructions.

20. A computer program product, the computer program product being embodied in a non-transitory computer readable storage medium and comprising computer instructions for:
  obtaining, by one or more processors, a target image;
  binarizing, by the one or more processors, the target image to obtain a target binary image;
  determining a plurality of areas of the target binary image;
  obtaining, by the one or more processors, a set of one or more image features of one or more of the plurality of areas of the target binary image;
  comparing at least one of the set of one or more image features to image features of a standard specified identifier image; and
  determining, by the one or more processors, at least one of the plurality of areas of the target binary image as a location of the standard specified identifier image based at least in part on the a result of the comparing of the at least one of the set of one or more image features to the image features of the standard specified identifier image.

* * * * *

UNITED STATES PATENT AND TRADEMARK OFFICE
CERTIFICATE OF CORRECTION

PATENT NO. : 10,360,689 B2
APPLICATION NO. : 15/705016
DATED : July 23, 2019
INVENTOR(S) : Gang Cheng, Rufeng Chu and Lun Zhang It is certified that error appears in the above-identified patent and that said Letters Patent is hereby corrected as shown below:

In the Claims

In Column 30, Claim 19, Line 13, after "on the" delete "a".

In Column 30, Claim 20, Line 40, after "on the" delete "a".

Signed and Sealed this
Thirtieth Day of June, 2020

Andrei Iancu
*Director of the United States Patent and Trademark Office*